United States Patent
Nishikawa

(10) Patent No.: US 6,556,198 B1
(45) Date of Patent: Apr. 29, 2003

(54) POLYHEDRON GENERATING METHOD AND APPARATUS THEREOF, AND STORAGE MEDIUM FOR STORING THE METHOD

(75) Inventor: Naoyuki Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/095,546

(22) Filed: Jun. 11, 1998

(30) Foreign Application Priority Data

Jun. 16, 1997 (JP) ............................................. 9-158950
Jun. 4, 1998 (JP) ........................................... 10-155907

(51) Int. Cl.⁷ .............................................. G06T 17/00
(52) U.S. Cl. ...................................................... 345/420
(58) Field of Search ................................ 345/419, 420, 345/423, 426, 421, 433, 424, 428, 619; 463/31

(56) References Cited

U.S. PATENT DOCUMENTS

| 4,888,713 | A | * | 12/1989 | Falk .......................... 345/419 |
| 5,163,126 | A | * | 11/1992 | Einkauf et al. ............. 345/426 |
| 5,506,947 | A | * | 4/1996 | Taubin .................... 345/423 X |
| 5,933,153 | A | * | 8/1999 | Deering .................. 345/420 X |
| 5,936,628 | A | * | 8/1999 | Kitamura .................... 345/420 |
| 5,936,869 | A | * | 8/1999 | Sakaguchi et al. ...... 345/423 X |
| 6,262,739 | B1 | * | 7/2001 | Migdal et al. .............. 345/423 |
| 2001/0050682 | A1 | * | 12/2001 | Deering ....................... 345/420 |

FOREIGN PATENT DOCUMENTS

JP            10-334272       * 12/1998

* cited by examiner

Primary Examiner—Jeffery Brier
Assistant Examiner—Chante' Harrison
(74) Attorney, Agent, or Firm—Fitzpatrick, Cella, Harper & Scinto

(57) ABSTRACT

In a polyhedron generating method for generating a polyhedron enveloping a sequence of points present in a coordinate space, polygon data representing polygons constituting the polyhedron is generated based on the sequence of points present in the coordinate space, and the polygon data is changed in such a manner that the normal vectors of the polygon data satisfy a predetermined condition.

12 Claims, 28 Drawing Sheets

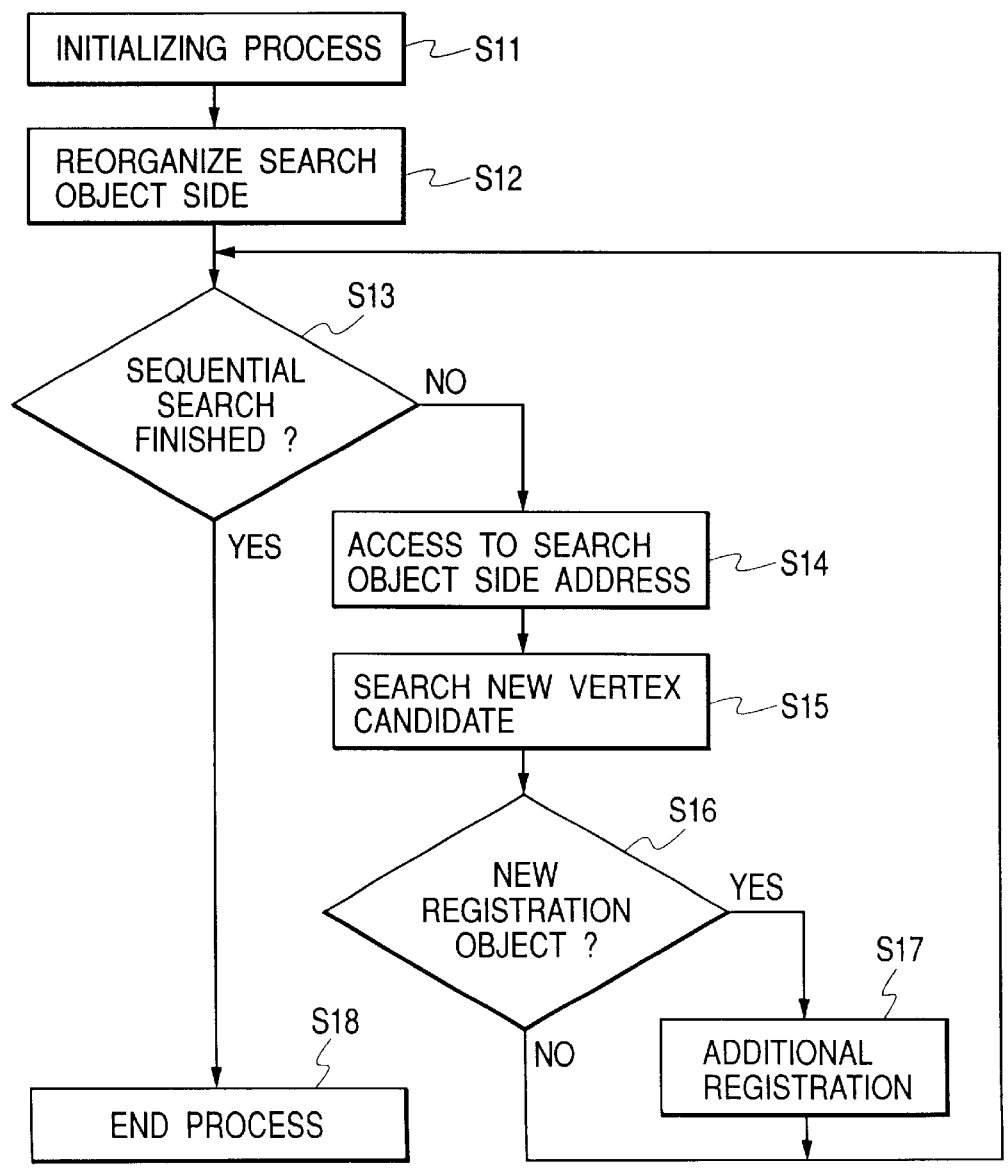

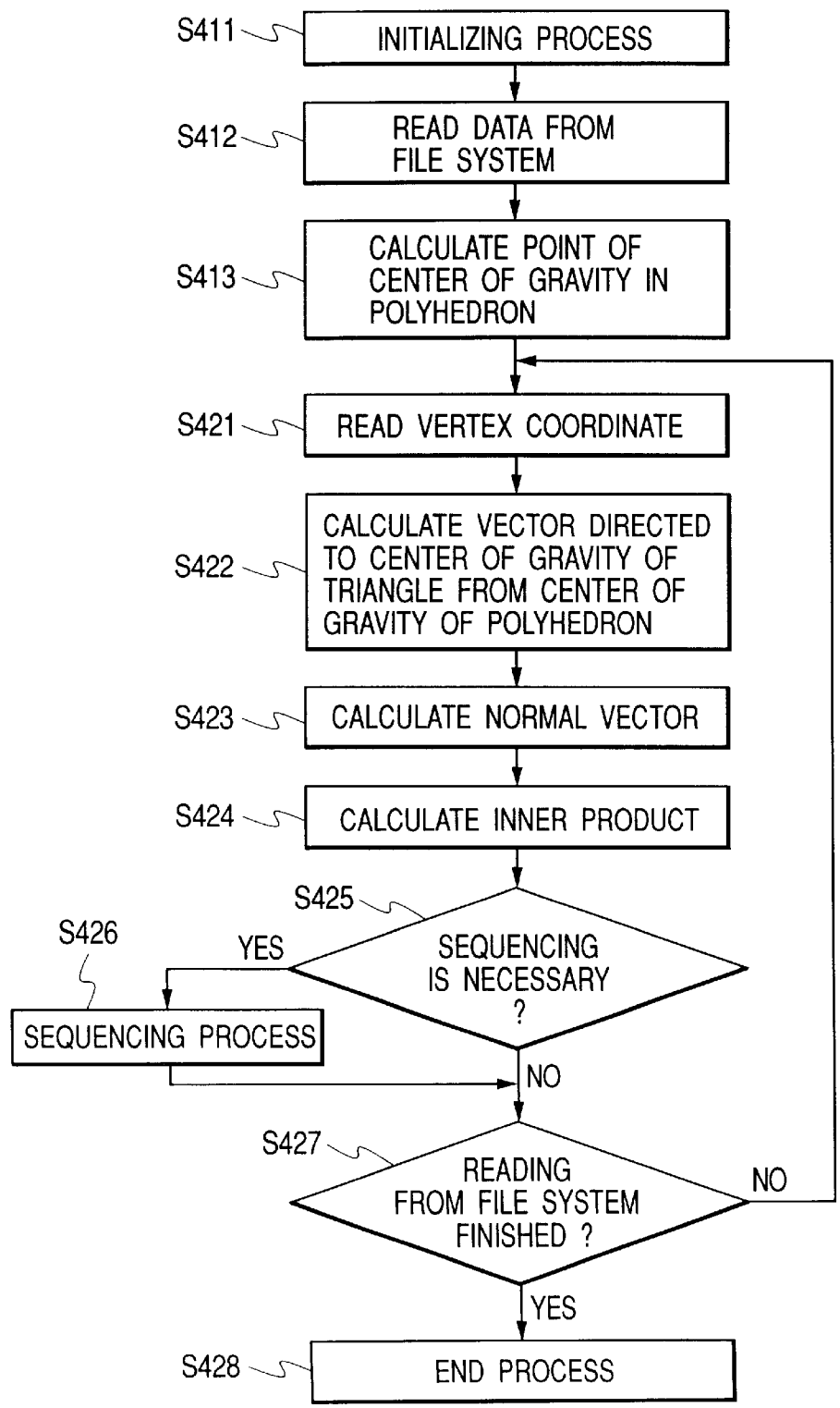

| 04-05-19 |
|----------|
| 04-11-05 |

| 04-19-05 |
|----------|
| 04-11-05 |

POLYHEDRON GENERATING METHOD AND APPARATUS THEREOF, AND STORAGE MEDIUM FOR STORING THE METHOD

BACKGROUND OF THE INVENTION

1. Field of the Invention

The present invention relates to a method for efficient generation of a polyhedron, an apparatus thereof and a storage medium for storing the method, land an image processing method for displaying a polyhedron, an image processing apparatus thereof and a storage medium for storing the method.

2. Related Background Art

It is already well known that a color is constituted by three attributes (luminosity, hue and saturation). For representing such three attributes in a three-dimensional Euclidean space by assigning these attributes to mutually orthogonal coordinates, there are widely utilized an RGB color space and an XYZ color space.

Among various color spaces, there are known so-called uniform perception color spaces for correlating the color difference with the spatial distance. Among these, the CIE1976-Lab space (hereinafter simply called Lab color space) is frequently utilized for analyzing the mapping state of colors or the color reproduction area of various color devices. For such analysis of the mapping state of colors or the color reproduction area of a color device, it is necessary to measure or calculate the color (Lab value) outputted by the color device and to plot such value in the Lab space. The term plotting means inscribing data in a graph. In a case of plotting data consisting of two variables, such data can be recorded as coordinate points in a plane represented for example by XY coordinates, but, in a case where each point is represented in a three-dimensional space, there should be utilized a three-dimensional (3-D) rendering function.

The 3-D rendering system is to represent a spatial object in a pseudo manner with a two-dimensional image, by generating an image projected onto a projection plane through a predetermined position of observation. There are often included additional functions such as the image rotation, enlargement and reduction in order to enable more detailed observation to the user. It is already known to utilize these functions for visualizing the data of the colors present in the color space.

There are already known various 3-D rendering systems for providing the above-mentioned 3-D rendering function. In some systems, the normal vectors of the triangular polygons to be drawn have to be made to mutually coincide for the face hiding process.

However, there has not been disclosed, on the polyhedron composed of triangular polygons etc., the method of automatic coincidence of the normal vectors of such polygons. For this reason, it has been impossible, in the 3-D rendering system in which the normal vectors of the triangular polygons are to be drawn for the face hiding process, to draw the polygons with unmatched normal vectors.

In the following there will be explained, with reference to FIGS. 9A and 9B, the relationship between the order of three vertices of a triangular polygon to be registered and the direction of the normal vector of such triangular vector.

The normal vector of a triangular polygon can be uniquely defined in its length, but the direction thereof has to be clearly defined according to the necessity. Therefore, the direction of such normal vector is defined as the advancing direction of a right-handed screw rotating along the order of the registered vertices. Therefore, for a triangular polygon registered in the clockwise direction in the order of 04→19→05, the normal vector is directed to the rear side of the drawing, same as the advancing direction of a clockwise rotating right-handed screw. On the other hand, for a triangular polygon registered in the counterclockwise direction in the order of 04→11→05, the normal vector is directed to the front side of the drawing, the same as the advancing direction of a counterclockwise rotating right-handed screw. From this example it will be understood that the normal vectors do not mutually coincide for the triangular polygon registered in the order of 04→19→05 and that registered in the order of 04→11→05.

Also in such system, in displaying triangular polygons with unmatched normal vectors, there may result a drawback that a triangular polygon to be displayed is not displayed.

SUMMARY OF THE INVENTION

An object of the present invention is to provide a polyhedron generating method capable of automatically changing the normal vectors, indicating polygons constituting a polyhedron, in such a manner that they satisfy a predetermined condition.

The above-mentioned object can be attained, according to a first invention of the present application, by a method for generating a polyhedron which envelops la sequence of points present in a coordinate space, the method comprising:

a polygon data generating step for generating polygon data indicting polygons constituting the polyhedron, based on the sequence of points present in the coordinate space; and a changing step for changing the polygon data in such a manner that the normal vectors of the polygon data satisfy a predetermined condition.

Another object of the present invention is to enable rapid generation of a polyhedron which envelopes a sequence of points present in a coordinate space.

The above-mentioned object can be attained, according to a second invention of the present application, by a method of generating a polyhedron which envelopes a sequence of points present in a coordinate space, the method comprising steps of entering a data group indicating a sequence of points present in the coordinate space, generating an N-hedron based on the data group and generating polygons constituting the polyhedron based on the data belonging to the surface of the N-hedron among the entered data group.

Also according to a third invention of the present application, there is provided a method of generating a polyhedron which envelopes a sequence of points present in a coordinate space, the method comprising plural polyhedron generating algorithms and comprising steps of entering a data group indicating a sequence of points present in the coordinate space and provided with a tag, selecting a polyhedron generating algorithm corresponding to the tag among such plural polyhedron generating algorithms, and generating polygons constituting the polyhedron from the data group utilizing the thus selected polyhedron generating algorithm.

Still other objects of the present invention, and the features thereof, will become fully apparent from the following description which is to be taken in conjunction with the attached drawings.

BRIEF DESCRIPTION OF THE DRAWINGS

FIG. 1 is a flow chart showing a process for generating polygon data constituting a polyhedron;

FIG. 2 is a flow chart showing a data changing process in the generation of polygon data constituting a polyhedron, in a first embodiment of the present invention;

DESCRIPTION OF THE PREFERRED EMBODIMENTS

Embodiment 1

At first there will be briefly explained a polyhedron generating process and a system for realizing such process.

For this purpose, a first embodiment will be explained with reference to FIGS. 1 to 6.

Figure 6:
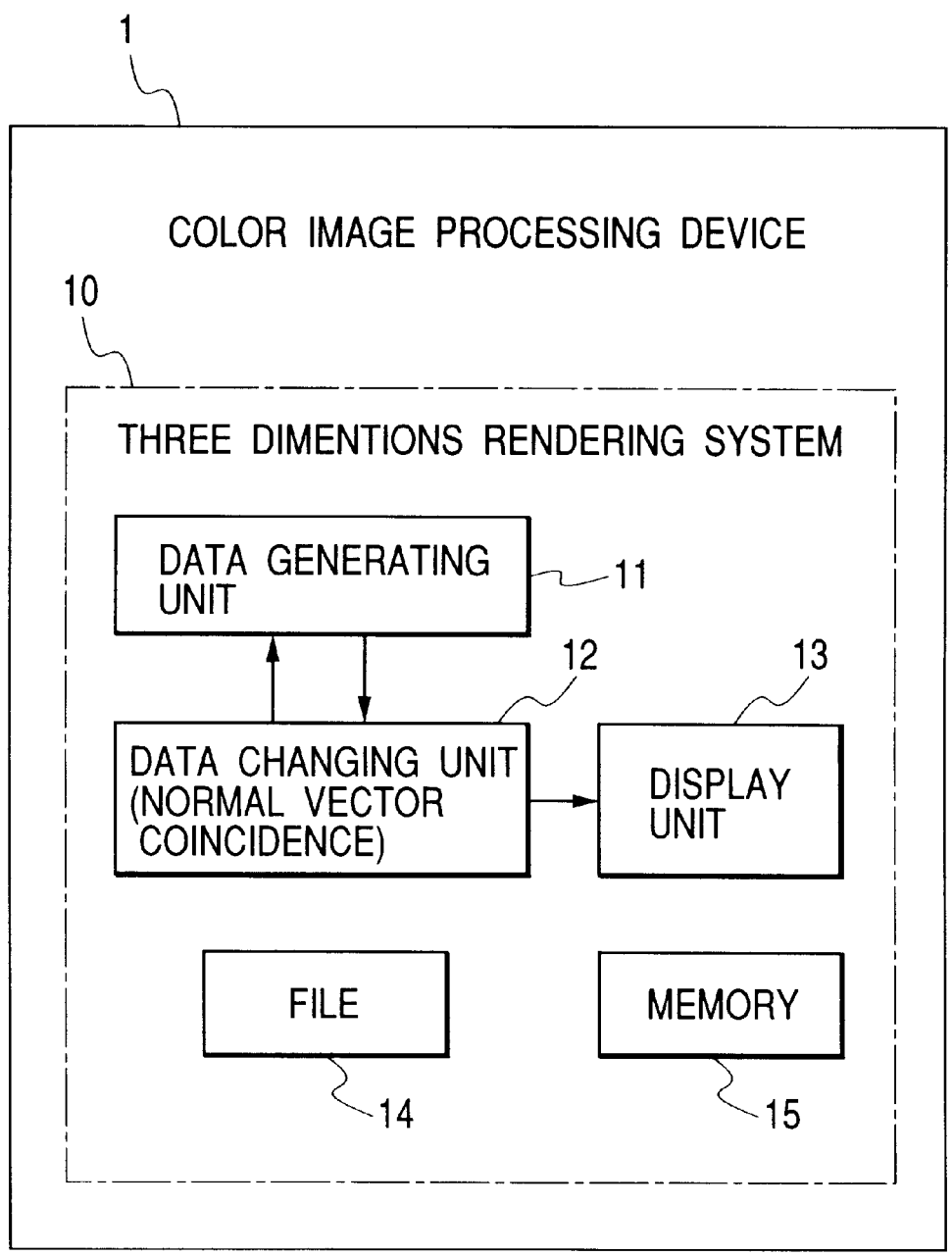
FIG. 6 is a block diagram showing an example of the configuration of a three-dimensional rendering system.

FIG. 6 shows an example of a three-dimensional rendering system (polyhedron generating device) 10 for providing a 3D rendering function in a color image processing apparatus 1.

The three-dimensional rendering system 10 is provided with a data generating unit 11; a data changing unit 12; a display unit 13; a file system 14 for storing the data of a generated polyhedron; and a memory 15 to be utilized in this embodiment as will be explained later.

The data generating unit 11 serves to fetch a sequence of points present in a coordinate space, generating a triangle from search object sides, and generating the vertices of such triangle as data of a triangular polygon constituting the polyhedron. In such polyhedron generating process, the vertices of each triangular polygon are registered as a set of data in the file system 14.

The data changing unit 12 calculates the normal vector of each of the triangular polygons constituting the polyhedron, and suitably changing the normal vector when necessary, thereby causing the normal vectors of all the triangular polygons constituting the polyhedron to coincide mutually. More specifically, at first a point is selected inside the generated polyhedron. As the center of gravity determined from the coordinates of the triangular polygons is generally positioned inside the polyhedron, such center of gravity may be employed as such internal point, but such selection is not essential. Then a set of vertex data is taken out from those of the registered triangular polygons. Subsequently an outer product vector is determined, based on the order of registration of the vertices and the coordinate data thereof, as the normal vector. Then there are determined the triangular center of gravity of the triangular polygon and the vector with the above-mentioned internal point, whereby calculated is a vector connecting the internal point and the center of gravity of the triangle. Then an inner product of thus calculated vector and the aforementioned normal vector, and thus calculated scalar value is used to suitably change the order of the registered vertex data if necessary. Such process allows the normal vectors of all the triangular polygons to mutually coincide.

The display unit 13 displays the polyhedron with all coinciding normal vectors, after the change of the registered order of vertexes of the triangular polygons constituting the polyhedron.

FIG. 1 is a flow chart showing a process for generating a polyhedron enveloping the sequence of points present in the coordinate space. At first a step S11 executes an initialization process for searching for an initial triangle. The initial triangle is searched in the vicinity of a pole point, such as a maximum or minimum value of the sequence of points present in the coordinate space. Then a step S12 reorganizes the search object sides, and registers a side, constituting the object of search, in the file system 14.

A step S13 discriminates whether the search has been completed, by checking in succession the sides registered in the foregoing step S12. If the search has not been completed, a step S14 makes an access to the address of the search object side, thereby fetching the coordinate data of the side registered in the file system 14.

A step S15 identifies, based on the coordinate data fetched from the file system 14, whether a new triangle can be generated from the search object side, thereby searching for a new vertex candidate. Then a step S16 discriminates whether the new vertex candidate overlaps with the already registered vertices, and, if it is the object of a new registration, a step S17 executes an additional registration in the file system 14. As explained in the foregoing, a search is executed in succession and a new adjacent triangle is generated from each triangle and is registered to generate polygon data.

Figure 4:
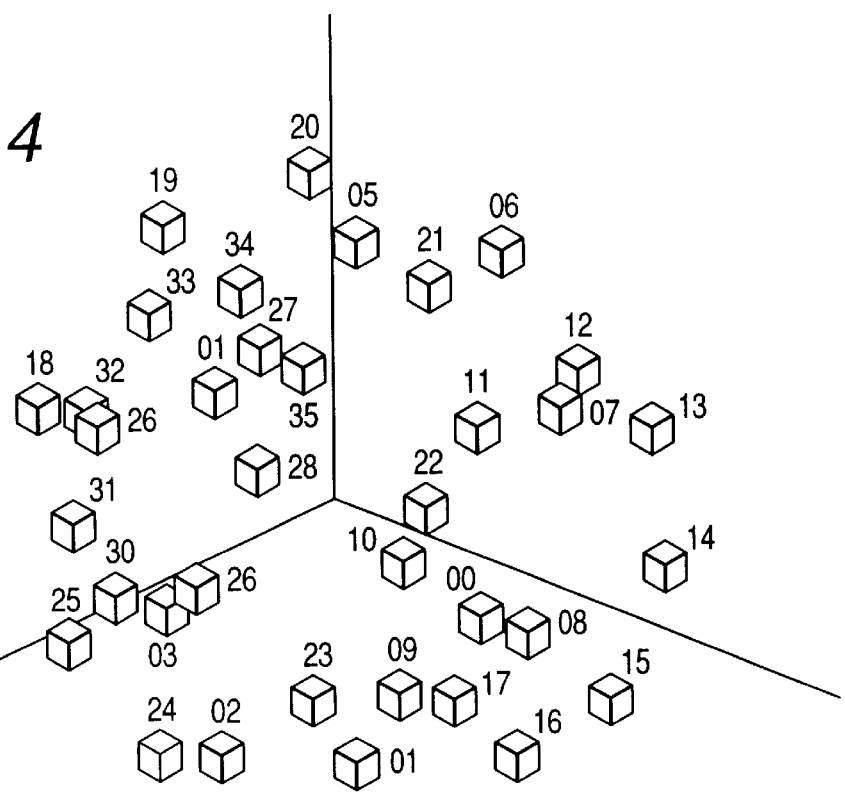
FIG. 4 is a schematic view showing a sequence of points present in a coordinate space.
Figure 5:
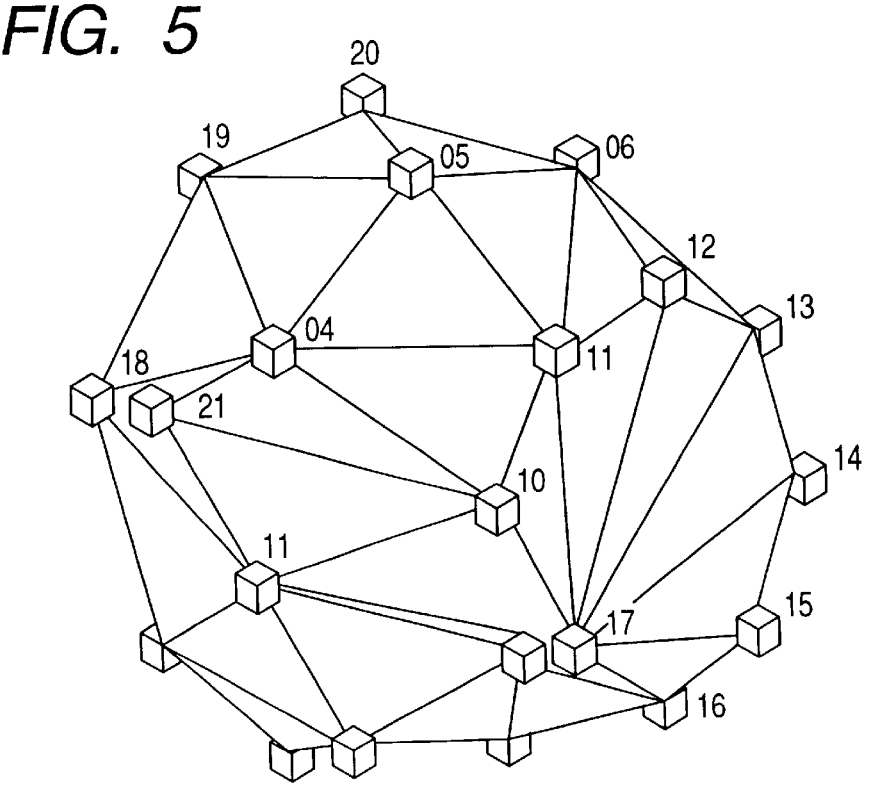
FIG. 5 is a schematic view showing a polyhedron enveloping the sequence of points present in the coordinate space.

The above-explained process shown in FIG. 1 allows one to automatically generate a polyhedron enveloping the sequence of points present in the coordinate space, as shown in FIGS. 4 and 5.

Figures 3A, 3B:
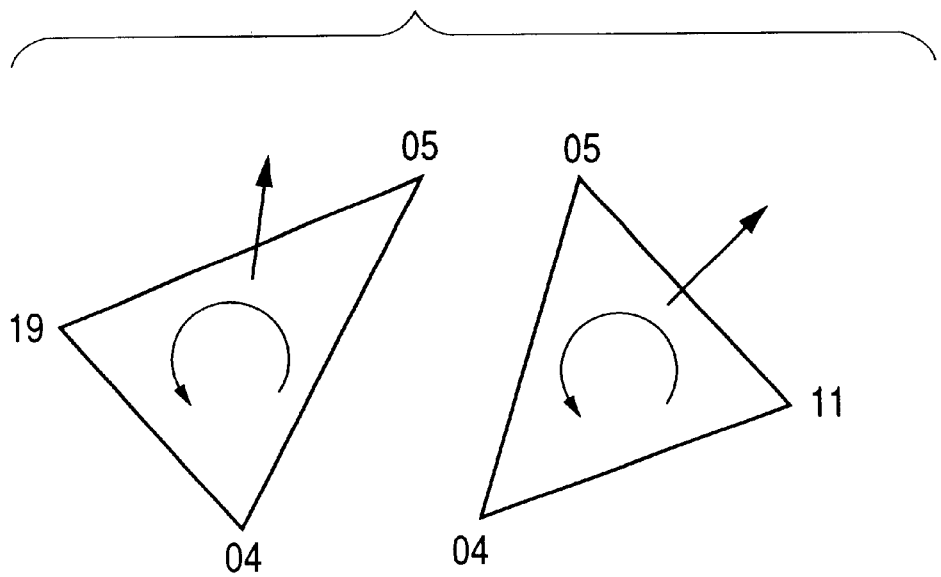
FIGS. 3A and 3B are schematic views showing an example in which the directions of normal vectors, defined by the order of registration of the vertices of triangular polygon, mutually coincide.

In the following there will be explained, with reference to FIGS. 3A and 3B, the relationship between the registered order to three vertices of a triangular polygon and the direction of the normal vector thereof in a three-dimensional rendering system.

The normal vector in a triangular polygon can be uniquely determined in length, but the direction thereof has to be clearly defined according to the necessity.

For example in a face hiding process, the triangular polygon to be subjected to the face hiding process is determined from the positional relationship between the position of the viewing point and the polyhedron. For achieving a high-speed face hiding process, there is known a method of executing the face hiding process for a triangular polygon in a case where the inner product of the normal vector (taken as positive in the advancing direction of the right-handed screw) thereof and a vector from the center of gravity of the triangular polygon to the viewing point is negative.

In the present embodiment, the direction of the normal vector is defined as the advancing direction of a right-handed screw rotating according to the registered order of the vertices, and there is executed a process of aligning the direction of the normal vectors of all the triangular polygons constituting the polyhedron.

Figures 9A, 9B:
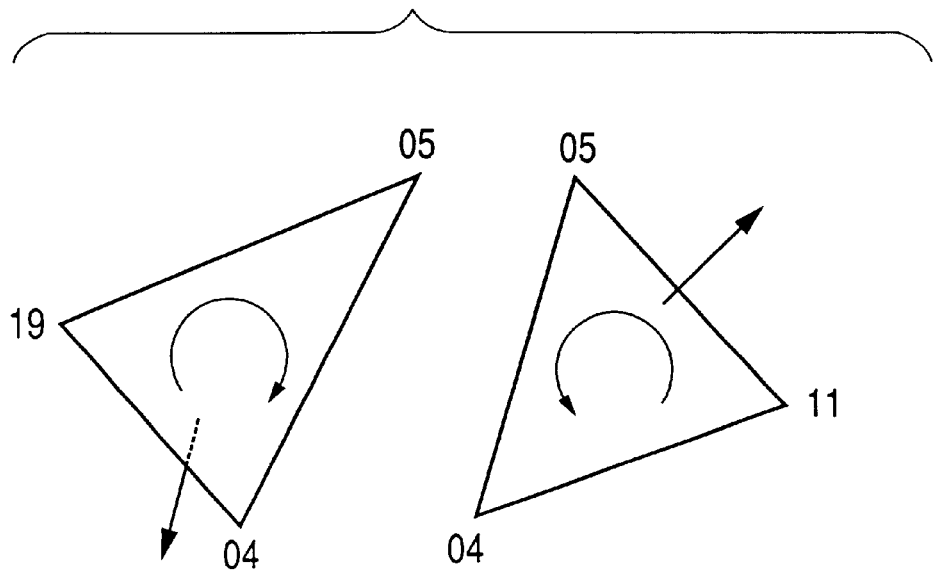
FIGS. 9A and 9B are schematic views showing an example in which the directions of normal vectors, defined by the order of registration of the vertices of triangular polygon, are mutually different.

In the aforementioned example shown in FIGS. 9A and 9B, for a triangular polygon registered in the clockwise direction of 04→19→05, the normal vector is directed toward the rear side of the drawing, so that, for the two adjacent triangular polygons, the normal vectors are in the mutually opposite directions. In such case, the direction of the normal vector is changed. More specifically, the normal vectors are aligned by rearranging the registration from 04→19→05 to 04→05→19.

In order to align all the normal vectors of the triangular polygons constituting the polyhedron, those of all the triangular polygons have to be set outward. For attaining such situation, there is executed a process of determining a vector from a point inside the polyhedron (an internal point or the center of gravity) to the center of gravity of each triangle, calculating the inner product of such vector and the normal vector, and, if the inner product is negative, changing the order of registration of the vertex data of such triangular polygon.

FIG. 2 is a flow chart showing a data changing process for investigating the vector of each triangular polygon and changing the order of registration of the vertexes, in order to align the normal vectors of all the triangular polygons constituting the polyhedron.

At first a step S411 executes an appropriate initialization process. Then a data reading step S412 fetches the data of the triangular polygons stored in the file system 14. A step S413 calculates the center of gravity of the polyhedron, based on the fetched coordinate data of the triangular polygons. Then a data reading step S421 again reads the coordinates of the vertices.

A vector calculating step S422 determines the center of gravity of a triangle and, based on the center of gravity of the polyhedron determined in the foregoing step S413, calculates a vector A directed toward the center of gravity of the triangle. A normal vector calculating step S423 calculates the components of the normal vector based on the registered order of the vertexes, and an inner product calculating step S424 calculates the inner product of the normal vector and the vector A.

In a discrimination step S425, the sequence branches to a rearranging step S426 in case thus calculated inner product is negative. The rearranging step S426 executes an interchange of the second and third ones of the vertex data of the triangular polygon, registered in the file system 14. An end judging step S427 judges whether the data reading has been completed, by referring to a file, and, if not completed, the sequence returns to the step S421, but, if completed, the sequence proceeds to an ending step S428 for executing an end process.

The normal vectors of all the triangular polygons constituting the polyhedron can be aligned by the appropriate change of the order of registration of the vertexes in the above-described manner.

Figure 7:
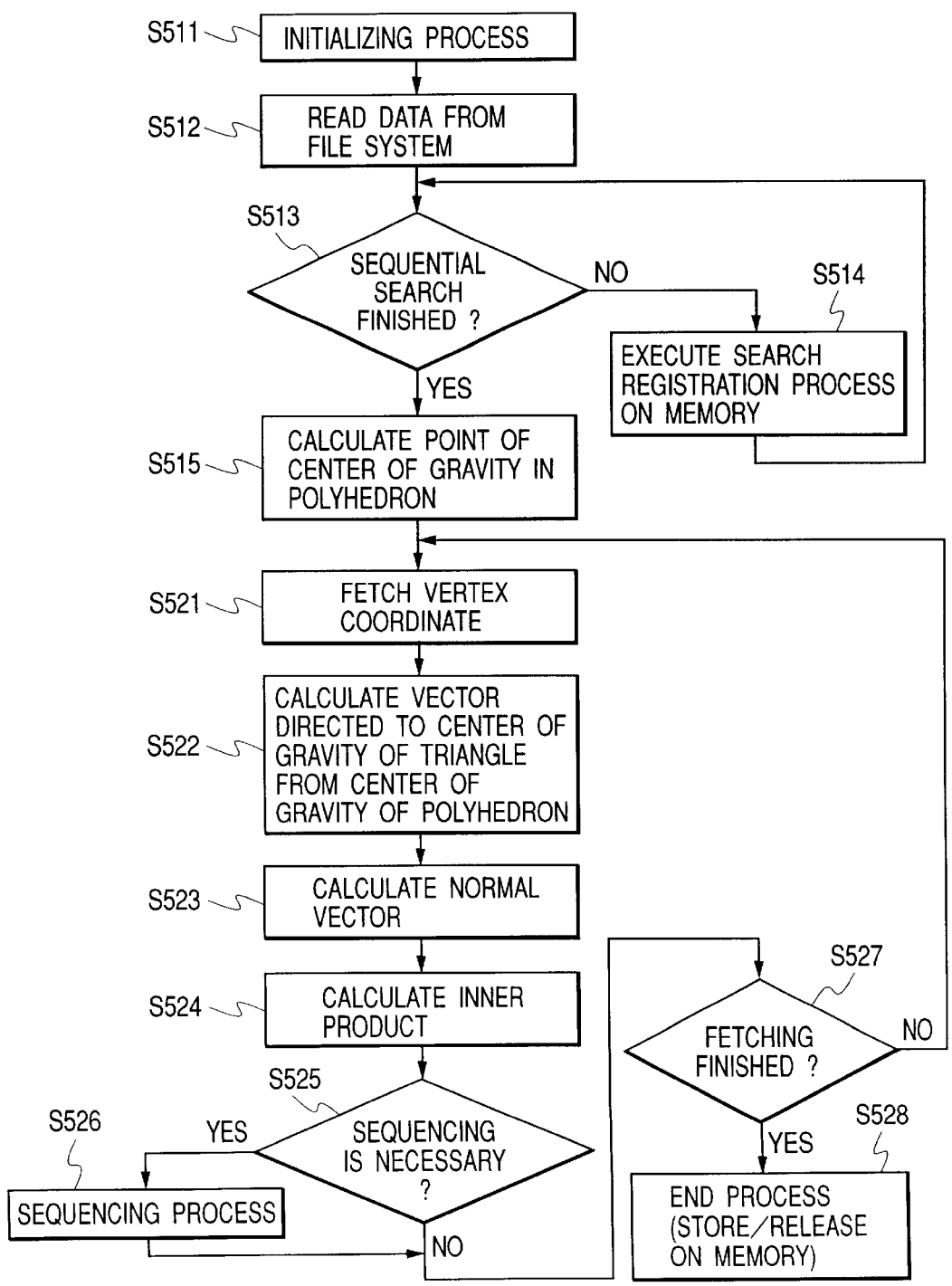
FIG. 7 is a flow chart showing a variation 1 of the first embodiment.

In the following there will be explained a variation 1 of the first embodiment, with reference to FIG. 7.

In the present variation, instead of reading and processing the data already registered for example in the file system 14 as in the first embodiment, there is executed a data reading process utilizing a memory 15 shown in FIG. 6, in the process of generating and changing the polyhedron.

At first an initialization step S511 executes an appropriate initialization process. A data reading step S512 fetches the data of the points registered in the file system 14. A search end judging step S513 is similar to the step S13 shown in FIG. 2, and a search registration step S514 is similar to the steps S14 to S17 in FIG. 2.

In the present variation, the data are not registered in the file system 14 in this state but the sequence proceeds to a next step while the data are temporarily retained in the memory 15.

A gravity center calculating step S515 makes access to the data of the triangular polygons stored in the memory 15 and calculates the center of gravity of the polyhedron. A coordinate fetching step S521 makes access again to the data in the memory 15 to fetch the coordinate data of the vertices.

A vector calculating step S522 determines the center of gravity of the triangle and calculates a vector A directed from the center of gravity of the polyhedron, determined in the foregoing step S515, to the center of gravity of the triangle. A normal vector calculating step S523 calculates the components of the normal vector based on the registered order of the vertices, and an inner product calculating step S524 calculates the inner product of the normal vector and the aforementioned vector A.

In a discrimination step S525, the sequence branches to a rearranging step S526 in case thus calculated inner product is negative. The rearranging step S526 executes an interchange of the second and third ones of the vertex data of the triangular polygon, registered in the memory 15. An end judging step S527 judges whether the process has been completed, by referring to a pointer or the like relating to the registered data, and, if not completed, the sequence returns to the step S521, but, if completed, the sequence proceeds to an ending step S528 for an ending process for reading and storing the data of the memory 15 and releasing the memory 15.

Figure 8:
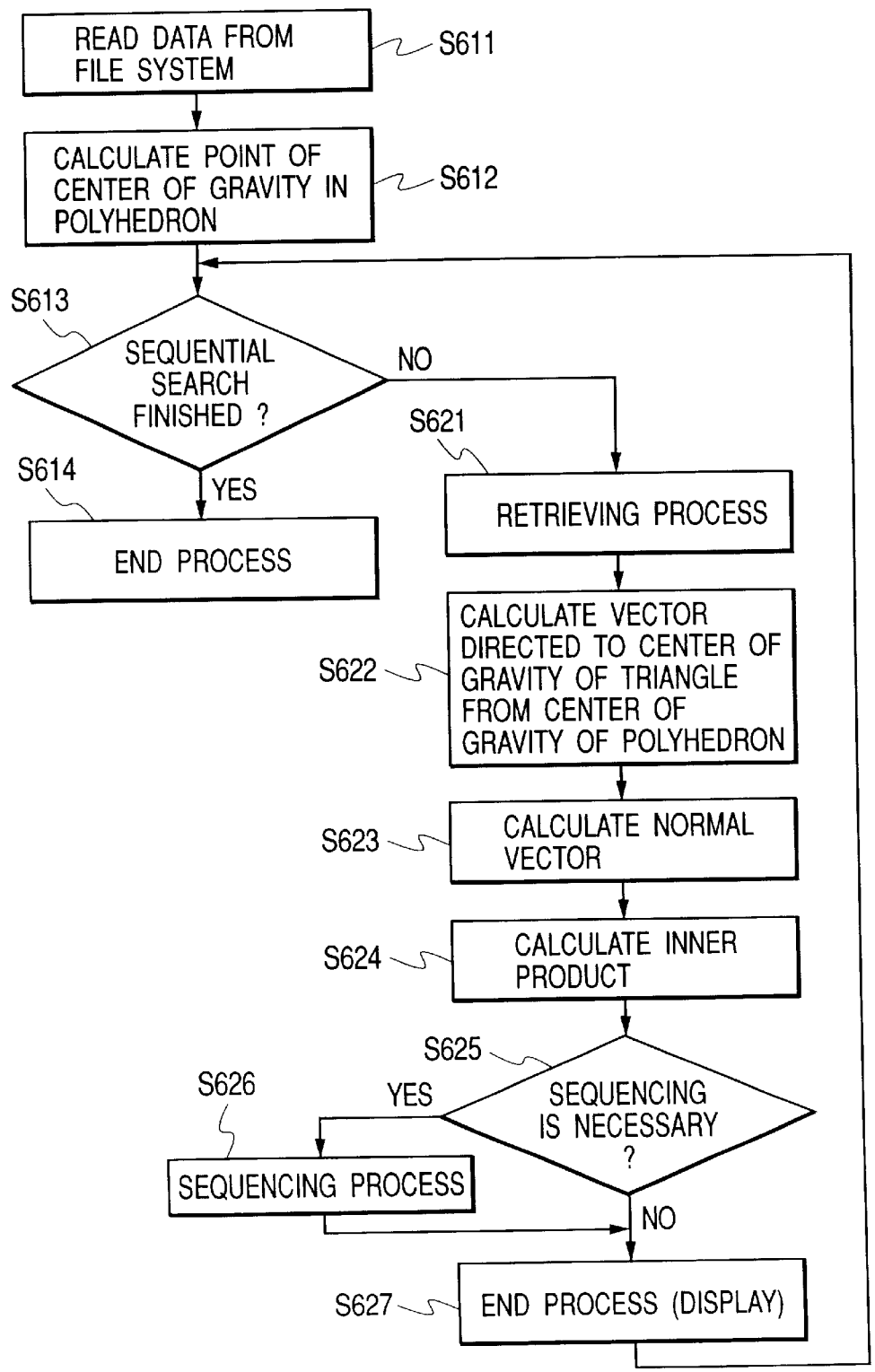
FIG. 8 is a flow chart showing a variation 2 of the first embodiment.

In the following there will be explained a variation 2 of the first embodiment, with reference to FIG. 8.

In the present variation, after the input of the data of the sequence of points as shown in FIG. 4, there is executed a process of displaying the searched triangular polygons in succession on the display unit 13 in the course of constructing the polyhedron shown in FIG. 5.

At first a data reading step S611 reads the point data stored in the file system 14. A center point calculating step S612 calculates the center point (internal point) of the polyhedron when it is constructed from the maximum and minimum values, etc. of each coordinate component of the point data.

A search end judging step S613 is equivalent to the step S13 in FIG. 2 and repeats the judgment whether the search has been completed, until the process is completed. A search step S621 searches for a triangular polygon to be newly registered, and executes temporary registration thereof in a temporary area. A vector calculating step S622 calculates a vector A directed from the center point of the polyhedron, determined in the foregoing step S612, to any of the three vertices constituting the triangular polygon.

A normal vector calculating step S623 calculates the components of the normal vector based on the temporarily registered order of the vertices, and an inner product calculating step S624 calculates the inner product of the normal vector and the aforementioned vector A.

In a discrimination step S625, the sequence branches to a rearranging step S626 in case thus calculated inner product is negative. The rearranging step S626 executes interchange of the second and third ones of the vertex data of the triangular polygon registered on the memory 15. Then a drawing step S627 executes, by the display unit 13, additional display of the triangular polygon of which the normal vector is aligned, and such adding operation is repeated until all the searches are completed.

Embodiment 2

For generating a convex polyhedron as shown in FIG. 5, the gift wrapping method is well known as the most basic process. This method consists, as shown in FIG. 1, of inputting a sequence of points, suitably processing the data utilizing an appropriate external point as the start point, and searching for a next point (vertex candidate) in repeated manner.

However, this method is known to be associated with a drawback that the required process time increases significantly in proportion to the number of the points to be processed.

The present embodiment eliminates the internal points of the convex polyhedron from the objects of search by a process to be explained in the following, thereby enabling prompt generation of polyhedron:

1) forming an octahedron with six end points corresponding to the maximum and minimum values on each of the three-dimensional axes;

2) reducing the number of points to be processed, by eliminating the points contained in the interior of the octahedron; and 3) applying the gift wrapping method to the data after the elimination of such internal points.

Otherwise, the number of data is decreased, after the formation of the octahedron, by selecting a point farthest from the plane of a triangle constituting the octahedron, newly constructing a tetrahedron with the sequence of points of the aforementioned triangle, and eliminating the points in the interior of the tetrahedron. This process can be made more effective by repetition by plural times.

The polyhedron generating method of the present embodiment will be explained with reference to the attached drawings.

Figure 10:
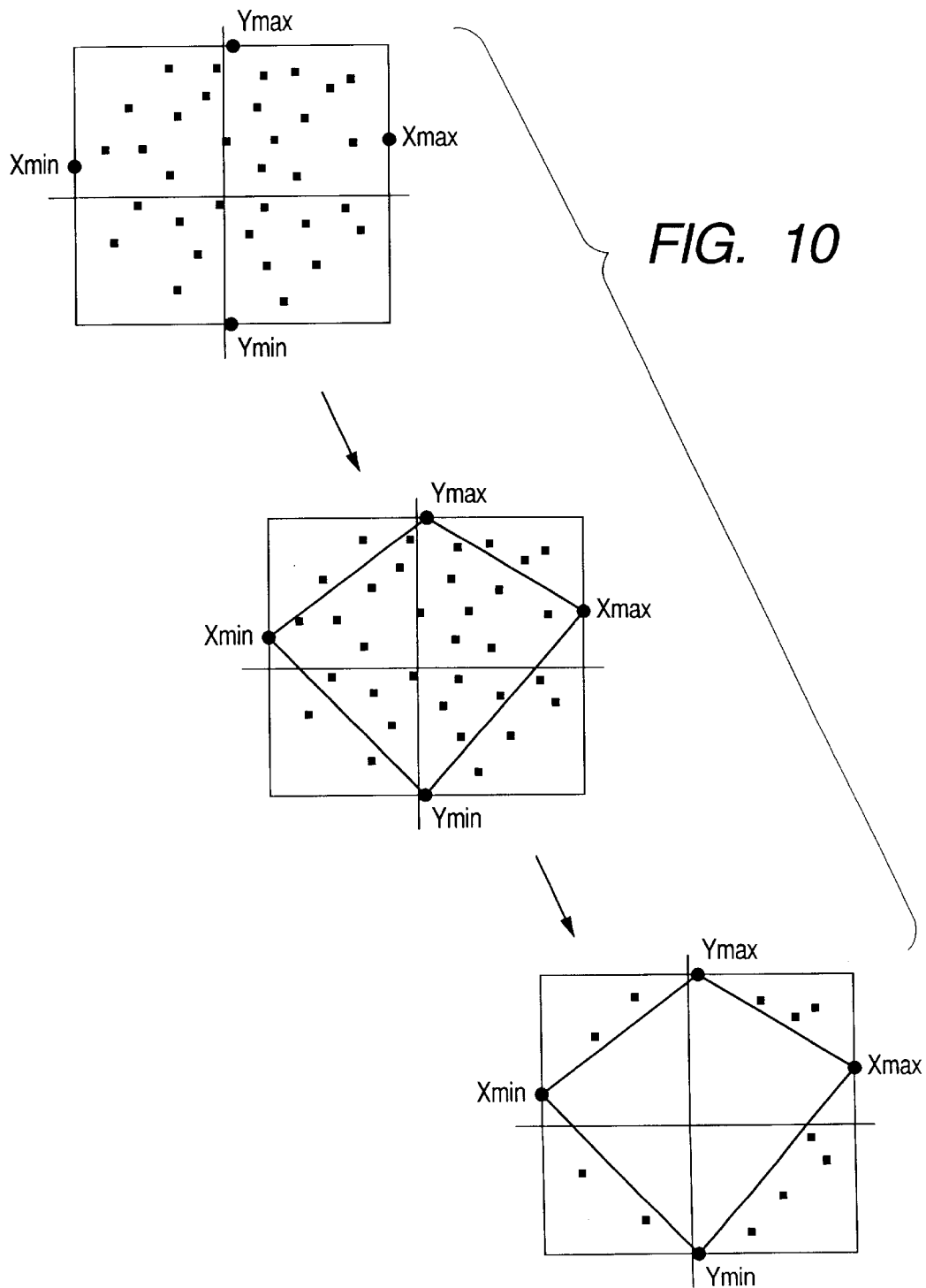
FIG. 10 is a schematic view showing the manner of eliminating internal points.

FIG. 10 shows the distribution of the sequence of data points, observed in a position perpendicular to the XY plane, and illustrates the manner of forming a rectangle from the maximum and minimum values in each of the X and Y axes and eliminating the internal points of the rectangle. As will be apparent from the drawing, the points surrounded by the rectangle, formed by the maximum and minimum values of each of the axes, cannot become the points constituting the surface and are therefore unnecessary in the subsequent process. The present embodiment is featured by significantly reducing the number of data to be processed by eliminating the points unnecessary for the process, thereby achieving a higher speed in the entire process. In case of planar data, the unnecessary points can be judged by the combinations of rectangles and/or triangles. Also in case the object space is three-dimensional such as a color space, the unnecessary points can be similarly judged with a polyhedron.

Figure 11:
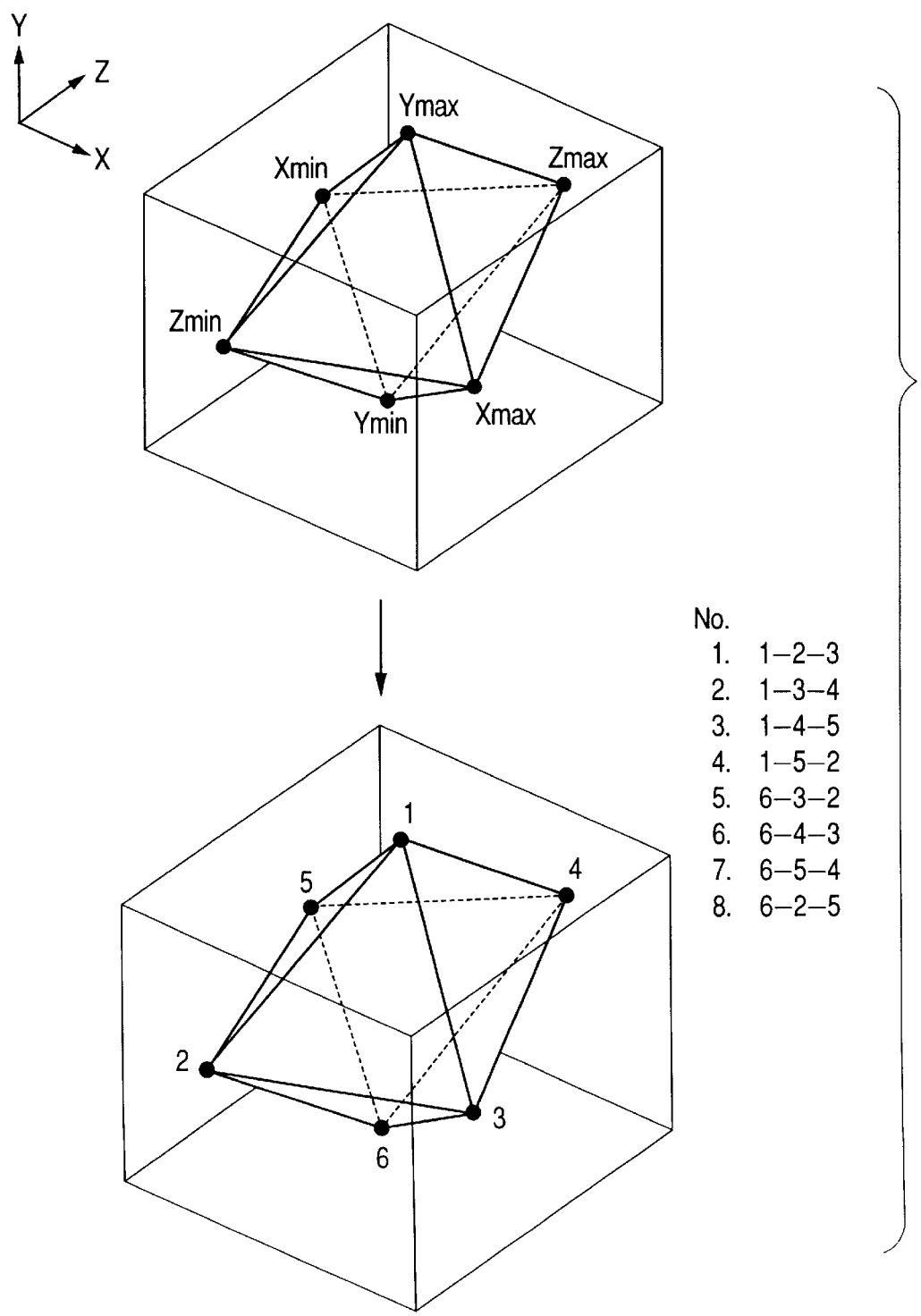
FIG. 11 is a schematic view showing a polyhedron constituted by six points selected as the maximum and minimum values on each of the X, Y and Z axes in a three-dimensional space.

FIG. 11 shows a case where the data to be processed are expanded to a three-dimensional space. As illustrated in FIG. 11, an octahedron is constructed by adding the maximum and minimum values on the Z-axis. By assigning vertex numbers 1–8 to the maximum and minimum values of the axes as illustrated, the octahedron is defined by eight triangles of 1-2-3, 1-3-4, 1-4-5, 1-5-2, 6-3-2, 6-4-3, 6-5-4 and 6-2-5.

Figure 12:
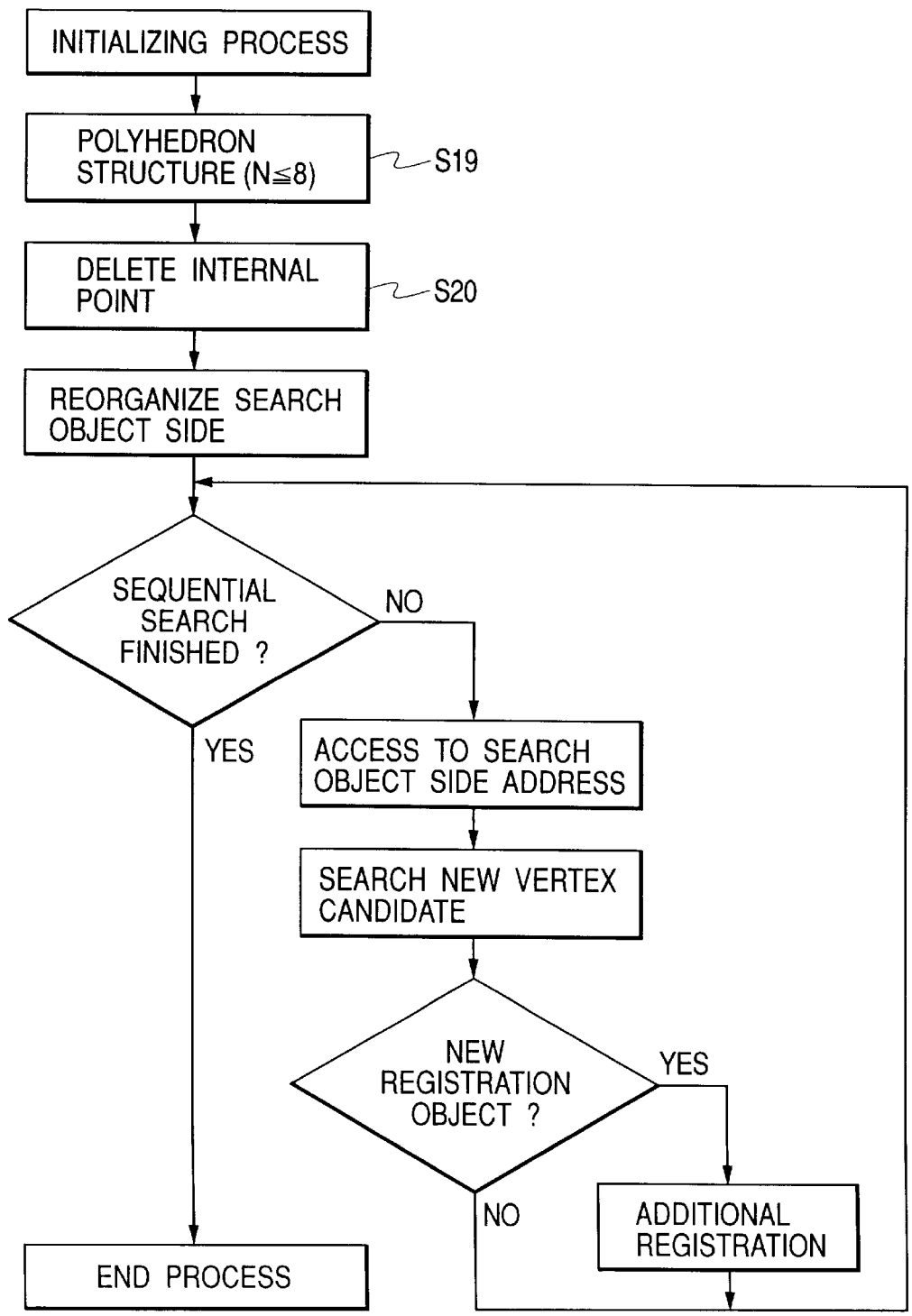
FIG. 12 is a schematic flow chart showing the process of an embodiment 2.

The present embodiment realizes a high-speed process by eliminating the points present in the interior of the octahedron. FIG. 12 is a schematic flow chart showing the process of the present embodiment. As a pre-process for the polyhedron generating process shown in FIG. 1, there are executed a step S19 of forming the octahedron and a step S20 of eliminating the internal points of the polyhedron. The number of points that can be eliminated by this process varies depending on the distribution of the entered data, but represents about 31.8% (=$1/\pi$) of the entire data, in case the data are substantially uniformly distributed in a spherical form with a radius 1.

This proportion corresponding the ratio, to the volume ($4\pi/3$) of a sphere of a radius 1, of the volume (4/3) of an inscribed octahedron. In an actual experiment, 435 points randomly generated inside a sphere required a process time of 51.8 seconds while the elimination process reduced the number of data to 324 points and the process time to 34.4 seconds. The difference of 17.4 seconds corresponds to a decrease of about 33%, approximately proportional to the rate of decrease of the number of data.

Variation of Embodiment 2

In the following there will be explained a variation of the second embodiment, with reference to FIGS. 13 to 15.

Figure 13:
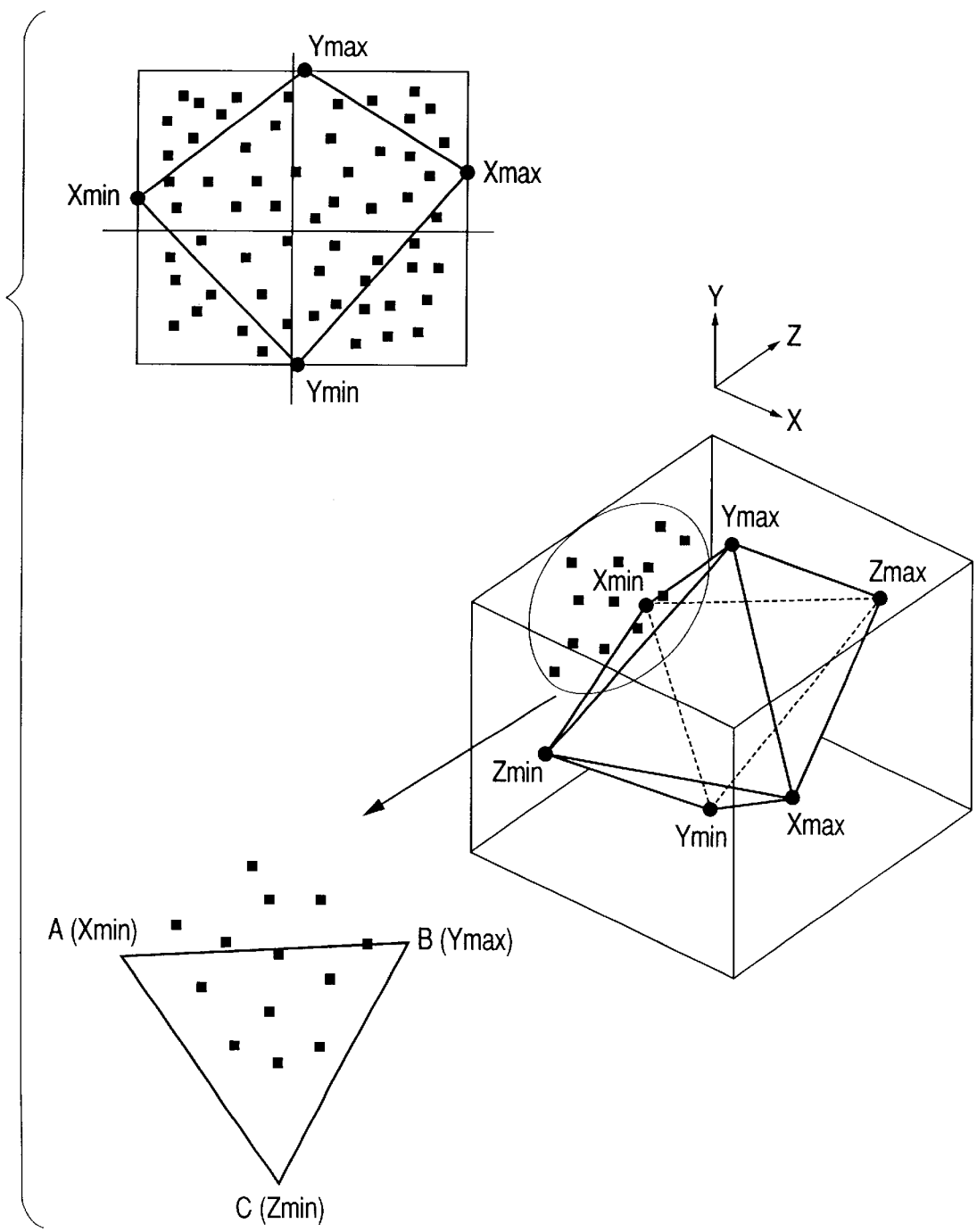
FIG. 13 is a schematic view showing the manner of selecting points on a triangular plane in a variation of the embodiment 2.
Figure 14:
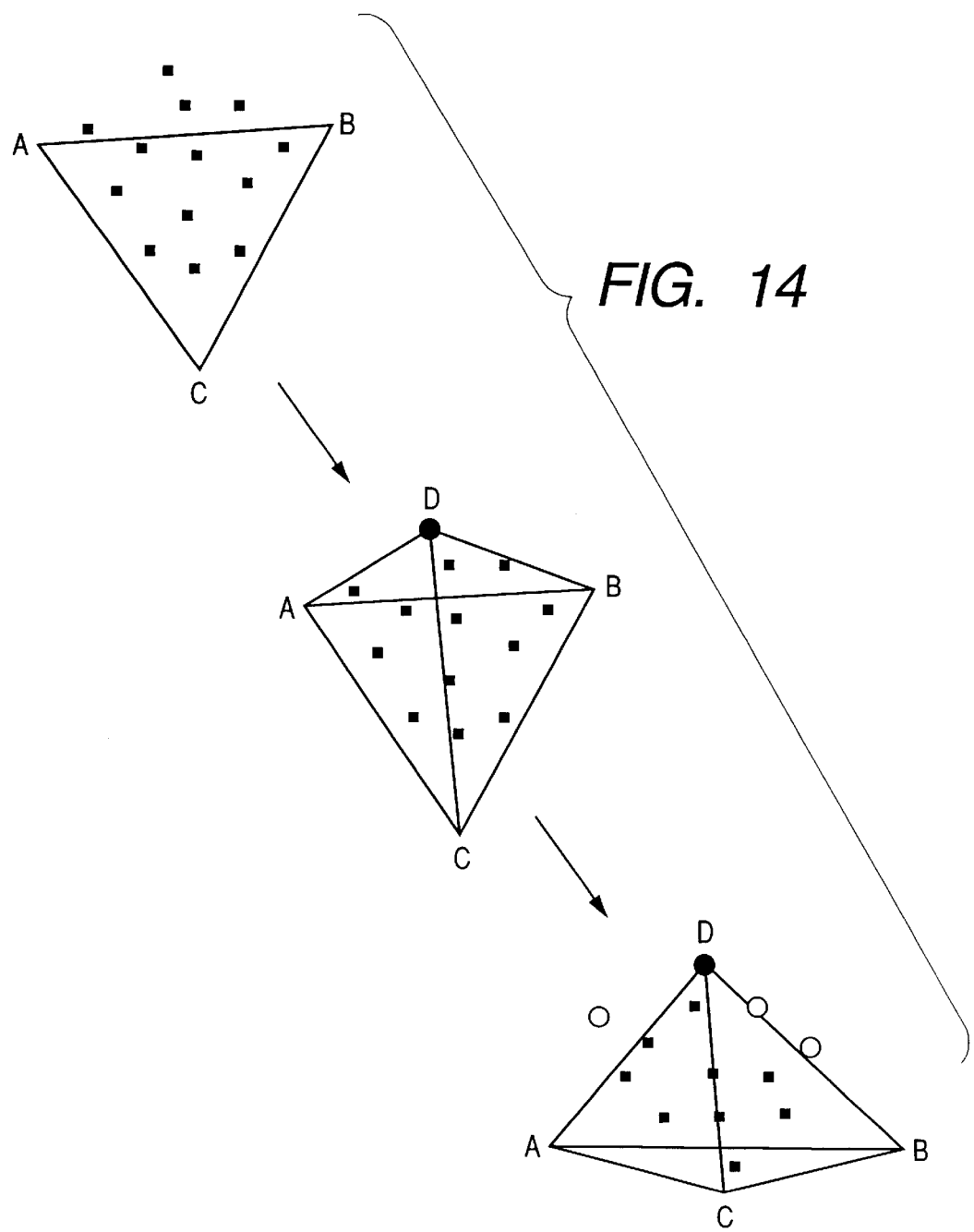
FIG. 14 is a schematic view showing the configuration of a tetrahedron and the manner of selecting internal points in the variation of the embodiment 2.

After the elimination of the points inside the octahedron as in the second embodiment, the points are present only outside the octahedron as shown in FIG. 13. The present variation, therefore, eliminates the point present in a tetrahedron formed by each of the triangles constituting the octahedron and a point farthest from the plane of such triangle, thereby increasing the number of the points to be eliminated and achieving a faster process.

At first, as shown in FIG. 13, three points Xmin, Ymax and Zmin are selected as points A, B and C, and there are selected points on a plane containing these three points. Then, as shown in FIG. 14, a tetrahedron is formed by selecting a point D farthest from the above-mentioned plane and the internal points of such tetrahedron are eliminated (steps S25, S26). This process is executed for each of all the faces constituting the octahedron. Then a similar process is repeated for the triangular planes constituting thus formed tetrahedrons. By terminating the process when the points are no longer present in the interior of all the tetrahedrons, the set of thus formed triangles represents the enveloping surface of the given sequence of points.

Figure 15:
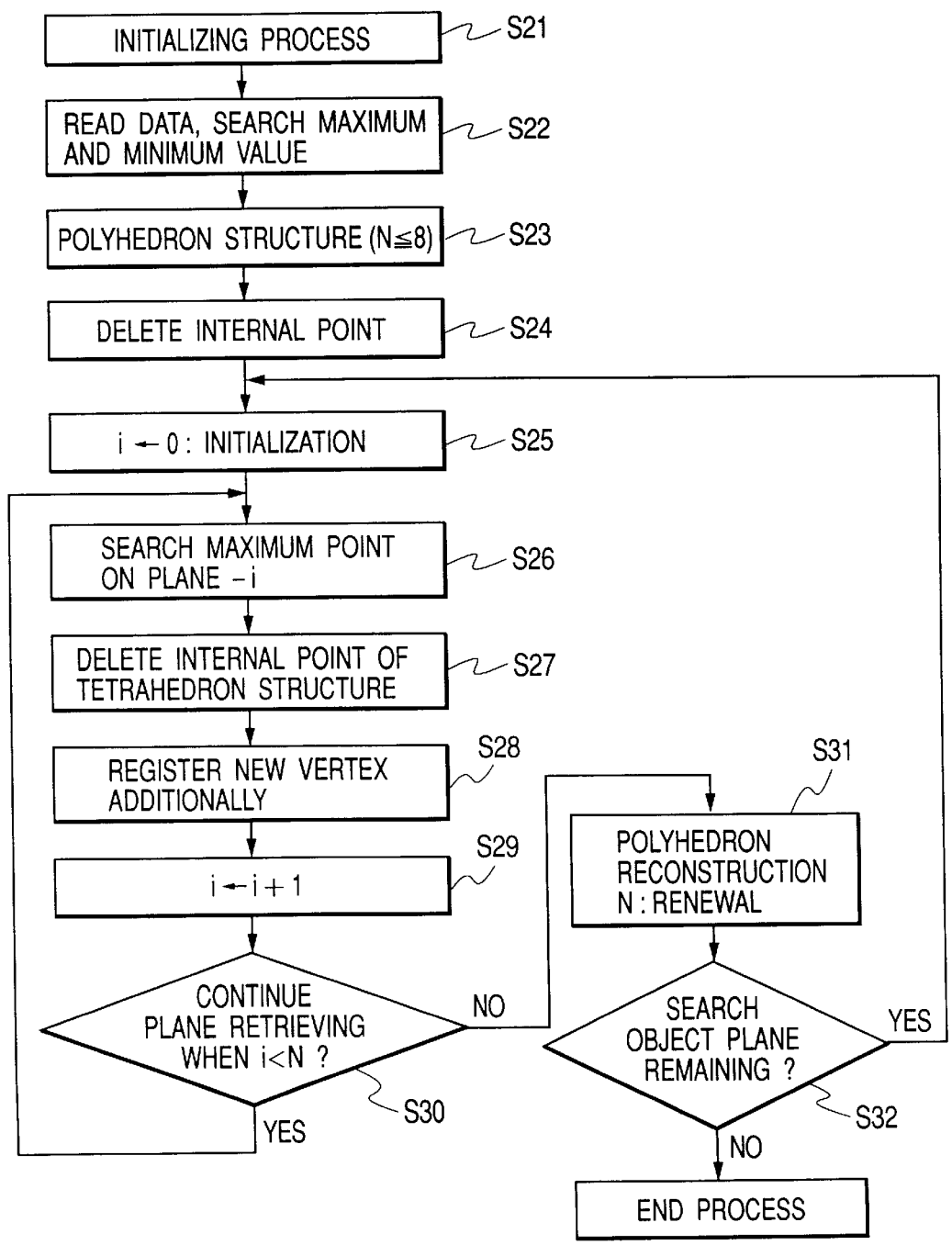
FIG. 15 is a schematic flow chart showing the process of the variation of the embodiment 2.

Now reference is made to FIG. 15 for outlining the process flow.

At first a step S21 executes an initialization process, and steps S22 to S24 determine an octahedron and eliminate the internal points of the octahedron as in the second embodiment.

Then a tetrahedron is formed by determining a point farthest from a plane constituting the octahedron (step S26), then the points inside the tetrahedron are eliminated (step S27), and the point searched in the step S26 is additionally registered as a new vertex (step S28). The process of the steps S26 to S28 is executed for all the planes constituting the octahedron (steps S25, S29, S30).

Then, based on the new vertices added in the step S28 and the eight vertices constituting the octahedron, the polyhedron is reconstructed and there is discriminated whether the polyhedron is to be made more complex. If the polyhedron is to be made more complex, the value N is renewed according to the reconstructed polyhedron (step S31). In case new points are searched in the step S26, a value 16 is set as N.

In case the step S31 renews the value N, there is repeated the process of the steps S25 to S31 for each of the faces (step S32).

The foregoing second embodiment and the variation thereof employ an octahedron and a tetrahedron, but a similar process can also be realized for example with a hexahedron or other suitable polyhedrons such as a dodecahedron.

Stated differently, the speed of the polyhedron generating process can be increased by eliminating as many unnecessary data points as possible, and there may be adopted any form of embodiment allowing to eliminate such unnecessary data points.

In generating a polyhedral model enveloping the sequence of data points present in a space, the second embodiment prevents a significant increase in the process time in proportion to the increase in the number of given points, thereby providing an efficient polyhedron generating process.

Embodiment 3

The gift wrapping method is known as the most basic method for generating a convex polyhedron, but there are also known many other methods for this purpose.

These methods have however been associated with a drawback that the process speed is not predictable in unique manner. For example an algorithm optimum for a certain distribution state of the data may show a lowered process speed for the data of another distribution state. Consequently it is ideally desirable to adaptively select an optimum algorithm, according to the distribution state of the data.

The third embodiment, therefore, provides a method of selecting an algorithm matching the distribution state of the data.

For this purpose, there are provided plural analyzing algorithms, and a data group of a determined type is given a tag corresponding to an optimum generating algorithm for the process, and the process is suitably switched by such tag, at the start of execution of analysis.

Also in a system capable of parallel execution of plural algorithms, for a data group of an undetermined type, the distribution state of the data is statistically analyzed and plural candidates of the generating algorithm optimum for the process are presented. Then these candidates are activated simultaneously and the interim results of the process are investigated to uniquely determine the algorithm optimum for the input data group, then the unnecessary process is erased in the interim state and the computer resource secured by such process is released.

In the following there will be explained, with reference to FIG. 16, a process of assigning, to a characteristic sequence of data obtained by a stationary experiment or measurement, a tag corresponding to such input data and selecting the kind of the applied algorithm according to such tag.

Plural data are respectively entered into a data selector. Each set of data is a data group measured under a respectively different condition. As an example, the data 1 is a data group obtained by measuring the colors outputted by a color ink jet printer, while the data 2 is a data group obtained by measuring the colors outputted by a color LBP. It is assumed to have been experimentally clarified that the process of the algorithm A is optimum for the data 1 while that of the algorithm B is optimum for the data 2, and a tag data designating the algorithm for the polyhedron generating process is attached to each of such data groups.

In response to the input of the data 1 or 2 with thus attached tag data, a tag analysis unit 30 (not shown) contained in the 3-D rendering system shown in FIG. 6 analyzes the tag data attached to the input data, thus selecting the algorithm suitable for the input data, and executes control in such a manner that the polyhedron generating process, to be executed by the data generating unit shown in FIG. 6, employs the thus selected algorithm.

More specifically, in case of the input of the data 1, the tag analysis unit 30 analyzes the tag A and selects the algorithm A.

In case of the input of the data 2, the tag analysis unit 30 analyzes the tag B and selects the algorithm B.

The above-described process allows, in the measurement or analysis of a fixed form, to execute the polyhedron generating process by employing the optimum algorithm according to the tag data. Consequently the polyhedron generating process can always be accomplished within a shorter time.

In the following there will be explained, with reference to FIG. 17, a process of selecting an appropriate algorithm for the input data of which the data distribution state is unfixed.

At first the given sequence of data are subjected to an analysis, and candidates of algorithm to be employed are presented according to the result of analysis. Then the process is forked corresponding to the number of thus presented candidates, and such candidate algorithms are simultaneously activated on a parallel-process computer. After a certain time from the start of the processes, the results of thereof are investigated, and, based on the result of investigation, the optimum algorithm is uniquely determined and selected while the available computing resources are solely assigned to the thus selected algorithm from the intermediate stage of process, thereby reducing the process time.

As an example, a data 3 consisting of a data group obtained by measuring the colors outputted by a color printer of any kind is entered. At first the data analysis unit 31 analyzes the data 3 and determines a certain number of candidates, from the plural algorithms A, B, C provided in the data generating means.

For example in case the algorithms B, C are selected as the candidates for the data 3, the data generating unit 11 executes control in such a manner that the processes based on the algorithms B, C are simultaneously activated (a candidate determining and forking step 32).

The processes B, C, activated simultaneously, inform a process supervising unit 33 of an intermediate report signal indicating the number of processed data (or level of progress of the process) at a predetermined timing. In response, the process supervising unit 33 determines the algorithm optimum for the data 3 and also releases a control signal to terminate the non-selected process.

The selected process is continued to complete the polyhedron generating process for the data 3.

On a multi-task operating computer, the process speed for a single process can be increased by effectively releasing the computing resources, so that the process can be completed with the fastest speed.

The data analysis unit 31 (not shown) is provided in the 3-D rendering system shown in FIG. 6. Also other process units are constituted by functions of the data generating unit.

Figure 16:
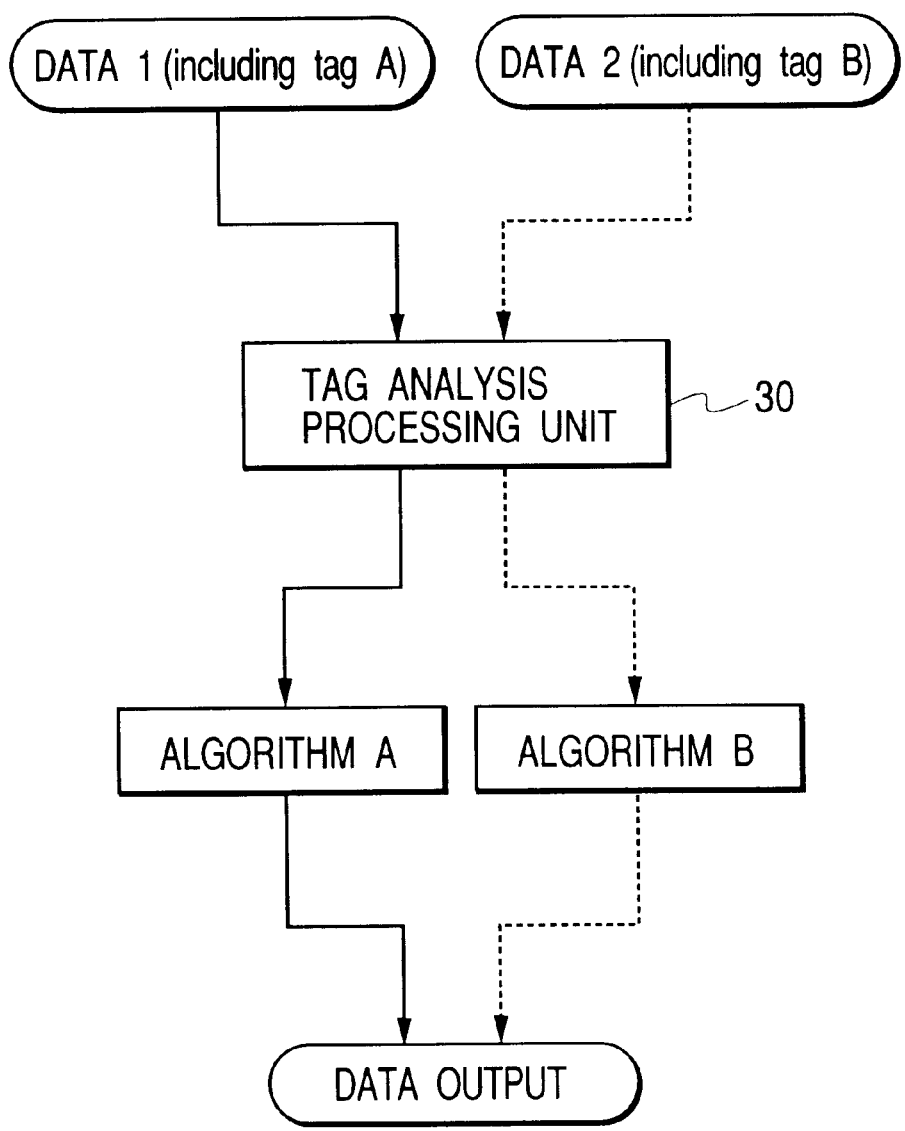
FIG. 16 is a view showing a process of selecting a polyhedron generating algorithm based on a tag attached to the data.
Figure 17:
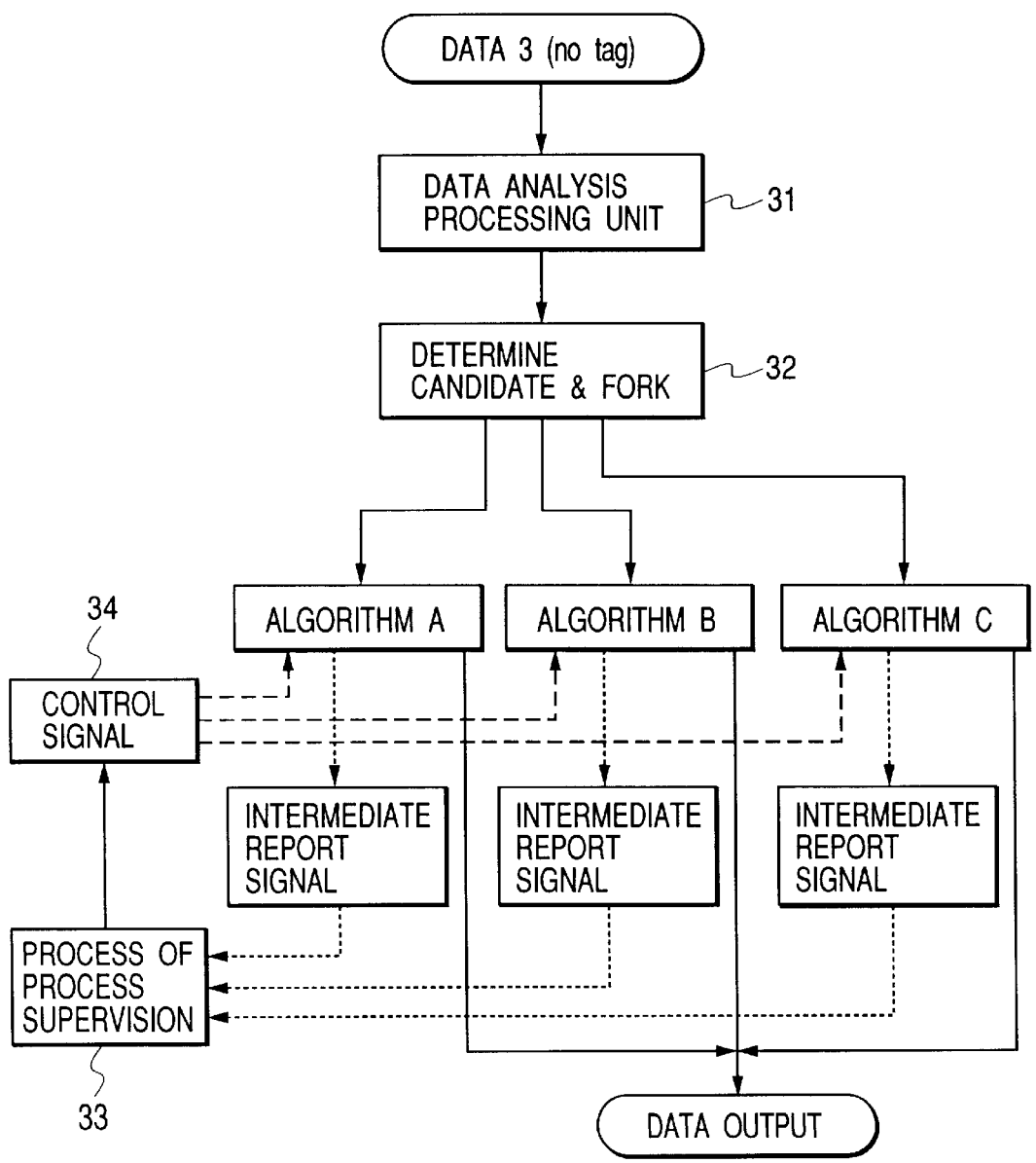
FIG. 17 is a view showing a process of selecting an appropriate algorithm by analyzing data.
Figure 18:
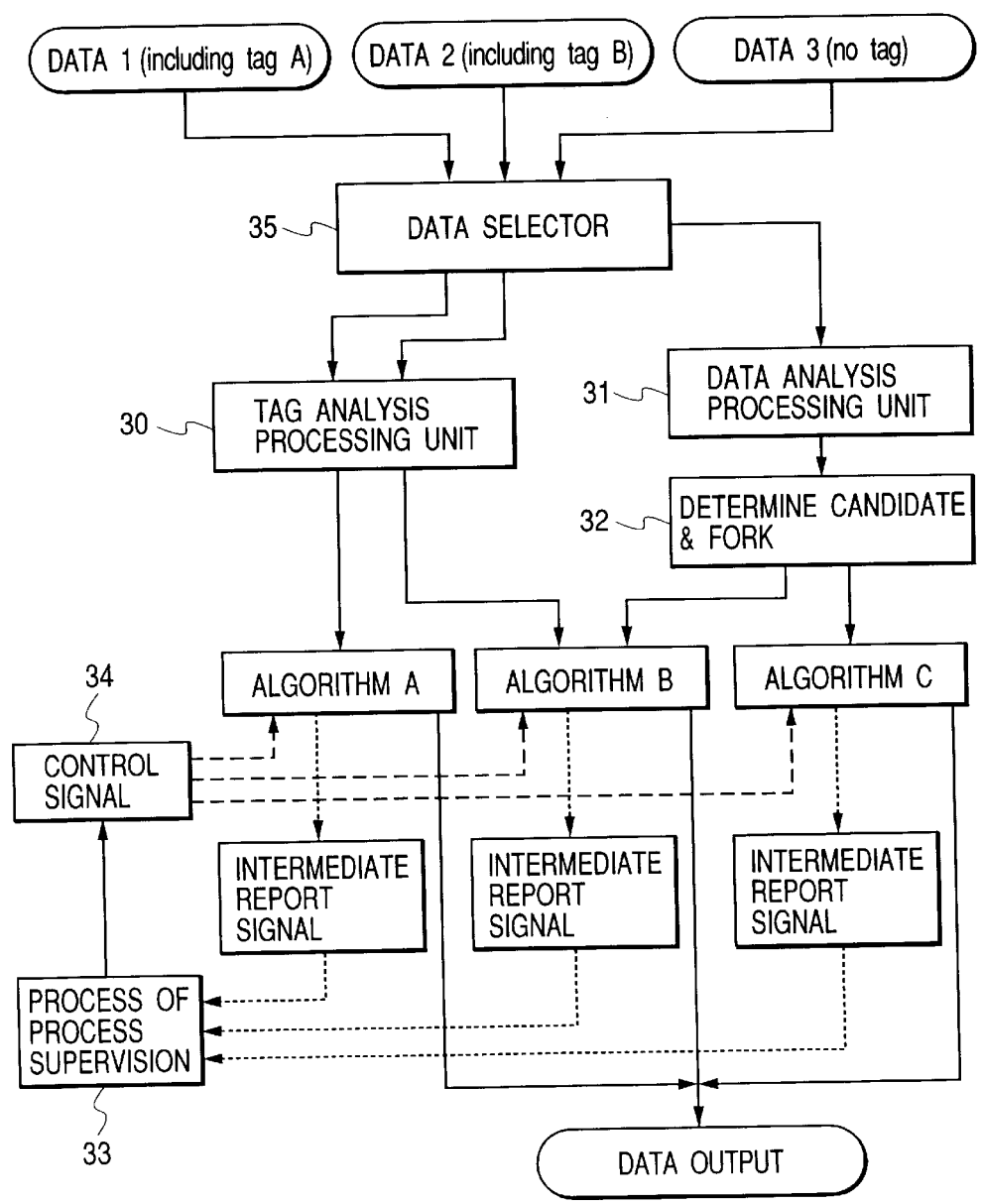
FIG. 18 is a view showing the configuration of an embodiment 3.

FIG. 18 shows an example of the configuration of the present embodiment, having the processing functions shown in FIGS. 16 and 17, and, in FIG. 18, functions equivalent to those in FIGS. 16 and 17 are represented by same numbers and will not be explained further.

The data selector 35 analyzes the input data, discriminates whether a tag designating the algorithm for the polyhedron generating process is attached to the input data, and effects control so as to execute the process shown in FIG. 16 or 17 respectively when the tag is attached or not.

In generating a polyhedral model enveloping the color data or like present in a space, the present embodiment allows to automatically select and execute an algorithm optimum for the distribution state of the given sequence of point data, without paying any particular attention to such distribution state, thereby constantly achieving a high-speed process.

Embodiment 4

A technology for reproducing the color image on a monitor as faithfully as possible on a color printer is called color matching, which is widely employed in recent years. In general the monitor has a wide color reproducing area while the printer has a narrower color reproducing area. Stated differently, not all the colors on the monitor can be reproduced on the printer. For overcoming this difference, there is utilized a technology called color space compression. Various methods and various compression rates are available for such color space compression, and can be suitably selected or assigned according to the situation of use. A drawback in such selection or assignment is that the function of the applied method is not easily understandable to the user.

The present embodiment provides a method of presenting the function of color space compression in a visually easily understandable manner, utilizing the 3-D rendering function explained in the foregoing first to third embodiments.

In the following there will at first be explained the outline of the present embodiment.

At first there is prepared a modeling unit capable of uniquely calculating the triangular polygon data group representing the color reproduction area in the space, and such modeling unit is used to generate model data representing the color reproduction area of a selected monitor and that after the color space compression of such selected monitor. Each of the polygon data is given an appropriate transparency attribute and is 3-D displayed. The user, while referring to the two color reproduction areas in 3-D display, additionally displays a specified color that has to be taken care of at the printing, and thereby arbitrarily selects a color space compressing method of the desired characteristics.

Consequently the color space compressing mapping, that has not been easily understandable, can be rapidly visualized by the triangular polygon data, whereby an optimum color document printing environment can be provided to the user in a more prompt manner.

In the following the present embodiment will be clarified in detail, with reference to the attached drawings.

Figure 19:
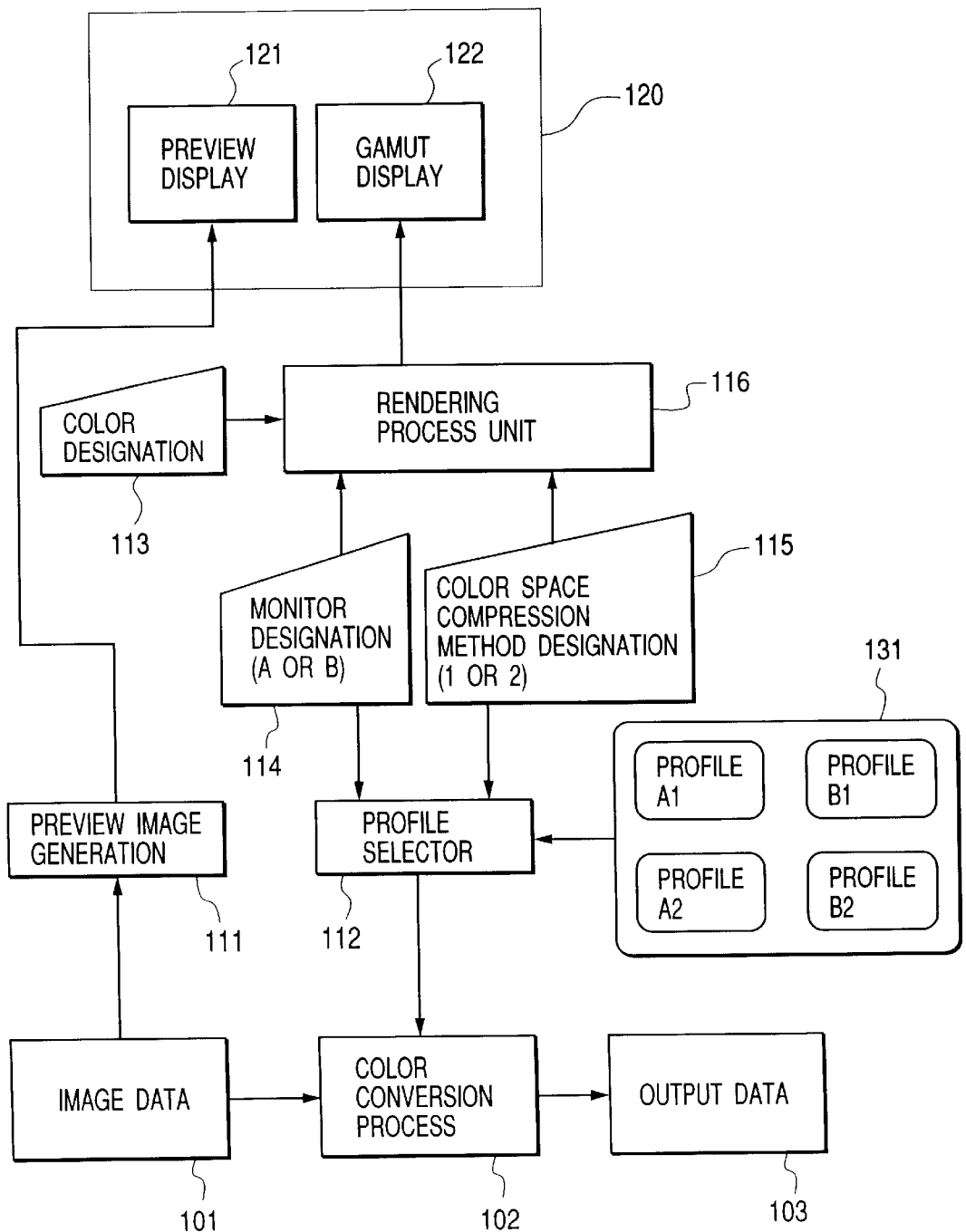
FIG. 19 is a schematic block diagram showing the entire process of an embodiment 4.

FIG. 19 is a schematic block diagram showing the internal process of a color printer driver incorporating the present embodiment. In the following there will be particularly explained, among the internal process of the driver, a setting process and a dolor conversion process changed by such setting. For the purpose of simplicity, the system is so assumed that the driver is incorporated in the operating system of a host computer, that monitors of two kinds, namely types A and B, are connected to the host computer are both capable of full color display and that the output printer is a local printer directly connected to a printer interface of the host computer and is capable of full color image output. The user prepares a color document, utilizing the host computer and outputs the document by the color printer. The prepared color document is subjected to editing, etc. while it is displayed on the monitor. The outputted color document is subjected to a color matching process in the driver in such a manner that the color thereof coincides with the color displayed on the monitor.

The color matching method is rendered optionally selectable between a hue preferential type and a saturation preferential type according to each document. These types both employ color space compression but are mutually different in the compressing method. In the following description, the options of color matching and the color space compressing methods are considered same for the purpose of simplicity. Also the CIE-1976Lab values are simply called Lab values. Furthermore, at the stage where the driver is installed in the operating system, the monitor of the type A and the hue preferential color matching option are selected as the default values.

Image data 101 are converted by a preview image generating process 111 into a preview image and is displayed on a monitor 120. While referring to such preview image, the user selects a specified color in the image and enters such color into a color designation input unit 113. For example, in a case where the image data contain a bar graph, the user selects a specified color (for example a particular blue color) in such bar graph and enters the RGB values of such selected color by a keyboard or a mouse. The type of the monitor and the option of the color matching are respectively designated by a monitor designating unit 114 and a color matching option designating unit 115, and such designations can be altered on a setting window of the driver. A profile selector 112 selects one of profile data A1, A2, B1 and B2, designated by the combination of the monitor type and the color matching option, from a profile file 131 and transfers the selected profile data to a color conversion process 102. When the printing operation is started, the color conversion process 102 executes an appropriate color conversion process on the input image data 101, utilizing the thus designated profile data and generates the output data 103 for printing.

Figure 20:
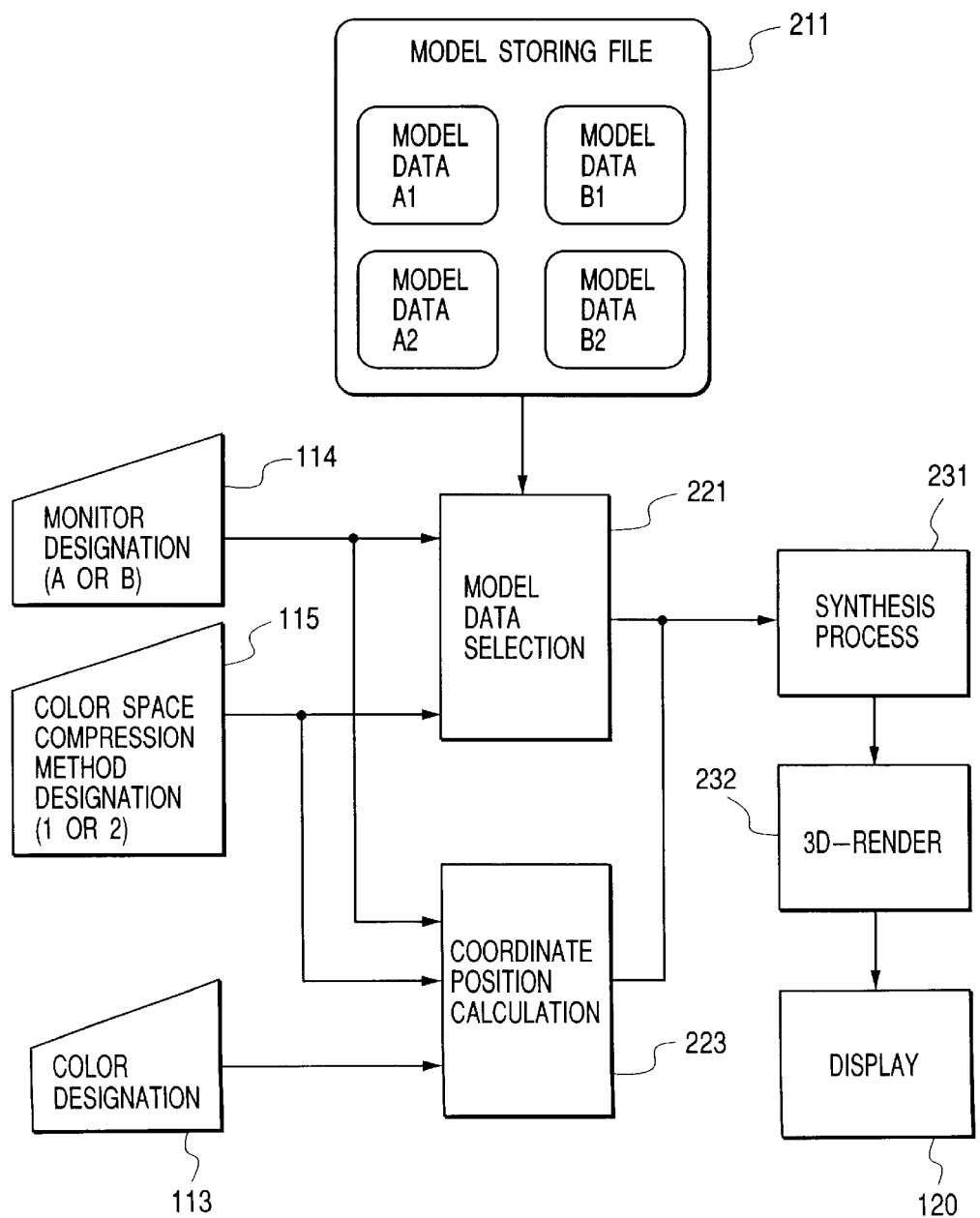
FIG. 20 is a schematic block diagram showing the process in a rendering process 116.

FIG. 20 is a schematic block diagram showing the interior of a rendering process unit 116 shown in FIG. 19. A model data selection unit 221 selects, from a model file 211, one of the model data a1, a2, b1 and b2 designated by the combination of the monitor type and the matching option and transfers the selected model data to a synthesis process 231. The color reproduction range is visualized, utilizing a polyhedron of which the surface is constituted by triangular polygons.

The model data are prepared in advance by a modeling unit and contain the color reproduction range of the monitor and that after the color space compression. Each of such ranges consists of plural vertices and triangular polygons obtained by the combinations of such vertexes, as exemplified in the following:

---

Filename "Model-A1"
ModelBegin // Monitor A (no compress)
    Vertex Px1, Py1, Pz1
    Vertex Px2, Py2, Pz2
    Vertex PxM1, PyM1, PzM1
    Polyline 3 ti1 tj1 tk1
    Polyline 3 ti2 tj2 tk2
    ...
    Polyline 3 tiN1 tjN1 tkN1
ModelEnd
ModelBegin // Monitor A (compressed)
    Vertex px1, py1, pz1
    Vertex px2, py2, pz2
    ...
    Vertex pxM2, pyM2, pzM2
    Polyline 3 ti1 tj1 tk1
    Polygon 3 ti2 tj2 tk2
    ...
    Polygon 3 tiN2 tjN2 tkN2
ModelEnd

---

Also based on the specified color (RGB values) entered into the color designation input unit 113, a coordinate position calculating unit 223 determines color coordinate values A (Ax, Ay, Az) on the currently selected monitor and color coordinate values A' (Ax', Ay', Az') after the color conversion by the currently selected color matching option, and then executes a conversion into a format corresponding to the rendering process, by a process to be explained in the following:

---

Filename "Model-Point"
ModelBegin // 2points
PointSet sphere radious(0.5)
    Vertex Ax Ay Az
    Vertex Ax' Ay' Az'
    Point 1 Color A
    Point 2 Color A'
ModelEnd

---

The present embodiment assumes, as the rendering space, a three-dimensional Euclidian space composed of x, y and z axes. As the Lab values are assigned to such space, the coordinate values thereof become equivalent to the Lab values. For the purpose of simplicity, the L, a and b axes are respectively assigned to the x, y and z axes. A synthesizing process 231 synthesizes the data of the selected model (aforementioned model A1) and the output file (aforementioned model point) of the coordinate position calculating unit 223, and transfers the synthesized file to a 3-D renderer process 232, which in response generates a two-dimensional image from the three-dimensional object and displays it on the display unit.

Figure 21:
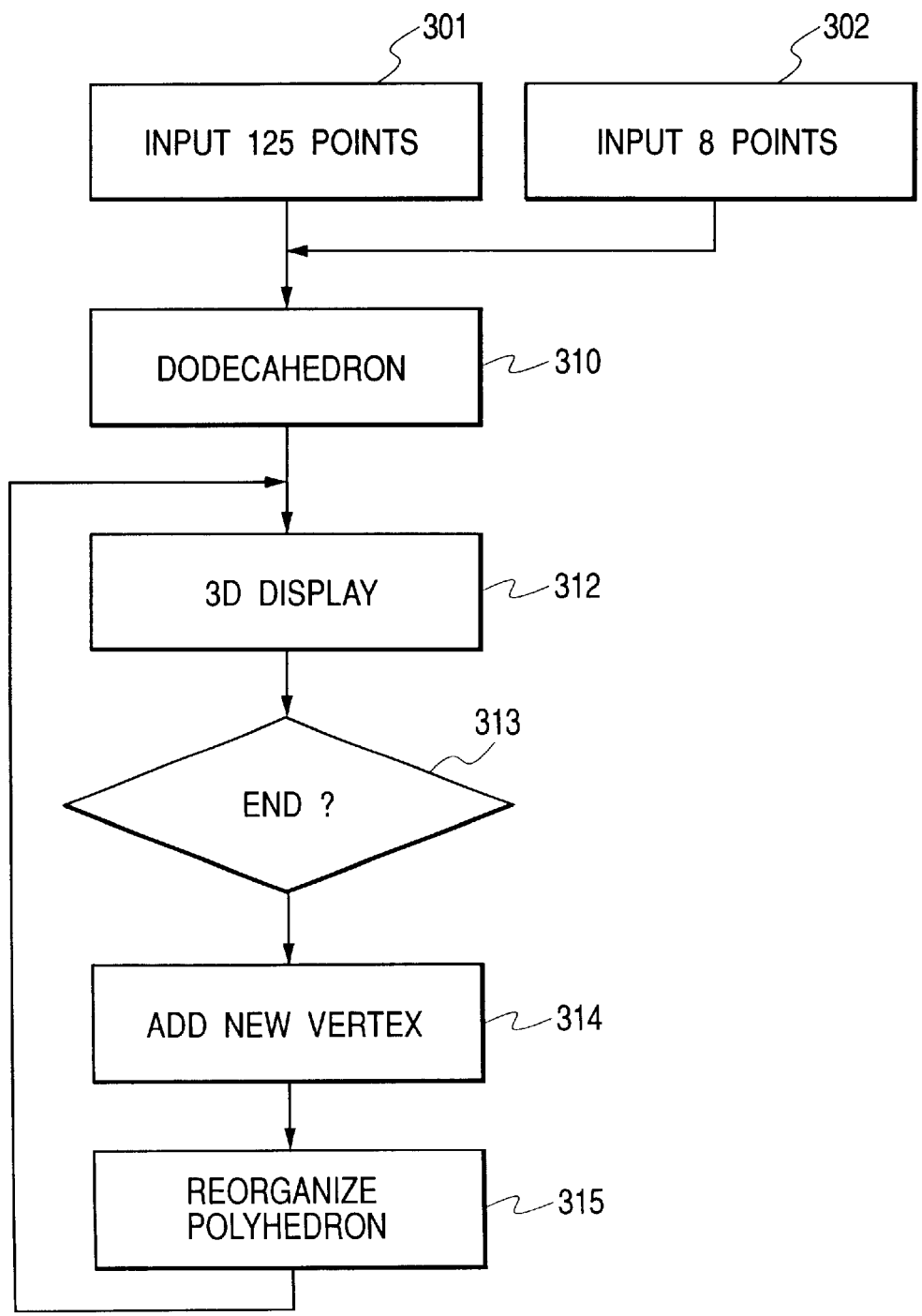
FIG. 21 is a schematic flow chart showing a modeling process for generating model data.

FIG. 21 is a schematic flow chart showing the process of the modeling unit for generating the model data.

At first a step 301 enters adjusted sample data of 125 points. In order to uniformly dividing the RGB space of the monitor, there are assumed samples of 125 points. By dividing a range from 0 to 255 on each of the R, G, B axes into 5 steps, there are obtained sample data of 5×5×5 points or 125 points in total. The Lab values are determined for each of the RGB data of 125 points and entered in the step 301. The input is executed in a combination of an ID number, RGB values and Lab values in this order. A step 302 enters the ID numbers of basic 8 colors (RGBCMYWK corresponding to eight vertices constituting the dodecahedron shown in FIG. 11), and a step 310 forms a dodecahedron from such ID numbers and the entered data of 125 points. A step 312 simultaneously displays the generated polyhedron and the 125 points. A step 313 terminates the process if the displayed polyhedron is sufficiently close to the color reproduction range. If not, a step 314 adds new vertices, then a step 315 reconstructs the polyhedron, and the sequence returns to the step 312 to execute the display again. This process is repeated to generate the polyhedron model until sufficient approximation is reached.

Figure 22:
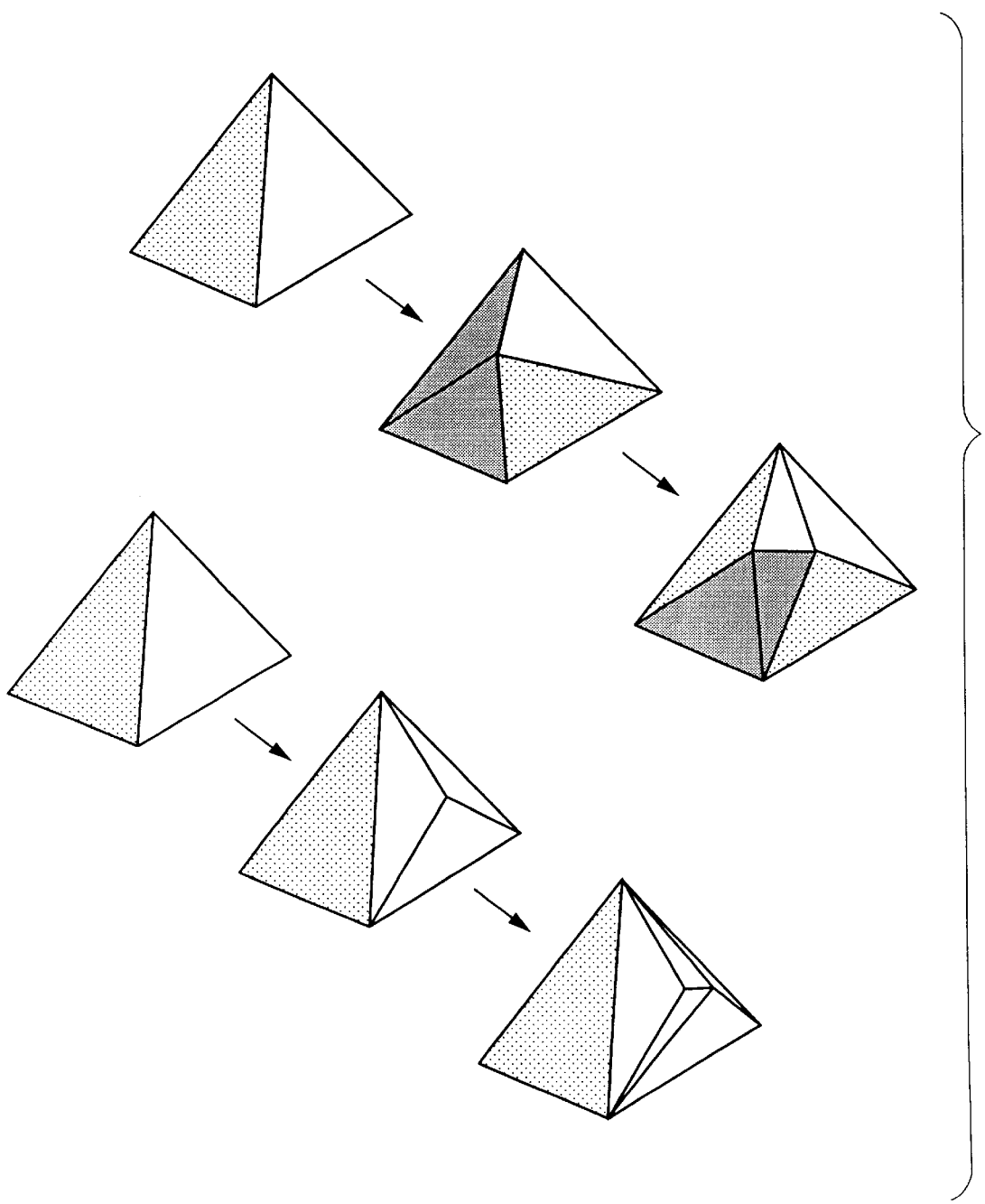
FIG. 22 is a schematic view showing the manner of division of adjacent triangular polygons by a new vertex.

FIG. 22 is a schematic view showing the manner of adding a vertex to each of the adjacent two triangular polygons, thereby increasing the number of faces. The triangular polygons are so constructed that the sample points are contained on the surface or in the interior of the 3-D displayed polyhedron and that a concave surface is formed in case the surface of the triangle is too distant from any sample point. The approximation of higher precision can be attained by employing a larger number of samples and carefully selecting all the points.

The modeling unit may also be composed of the data generating unit 11 and the data changing unit 12 explained in the foregoing first to third embodiments. The methods explained in the first to third embodiments allow to apply geometrical calculations on the sequence of points present in the space, thereby automatically generating the polyhedron at a high speed.

Figure 23:
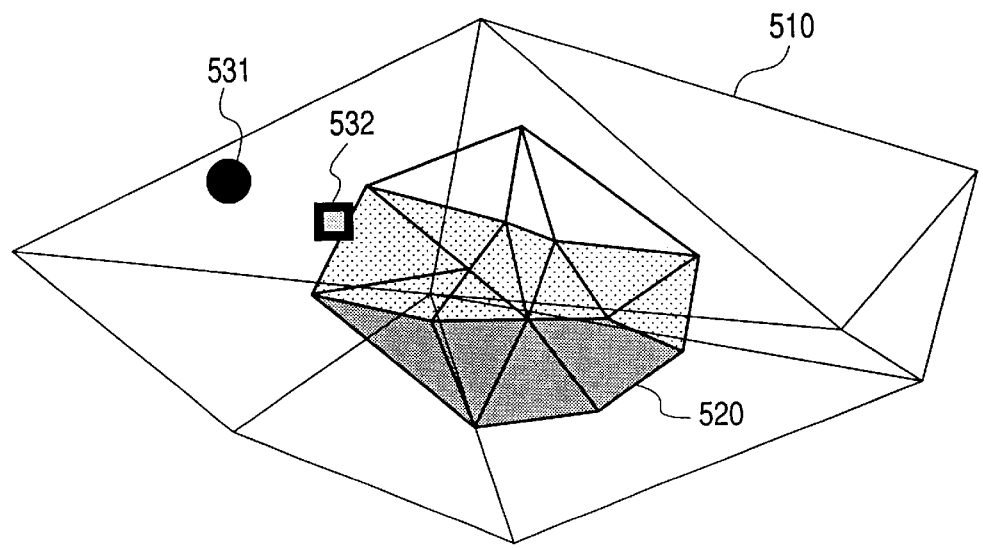
FIG. 23 is a view showing an example of three-dimensional display.

FIG. 23 shows an example of actual 3-D display, wherein a polyhedron 510 represents the color reproduction range on the monitor, in which the triangular polygons are represented only by the sides thereof. On the other hand, a polyhedron 520 indicates the color reproduction range after the color space compression, in which the triangular polygons are represented by the sides and the planes thereof. In the 3-D display of the present embodiment, because of the face hiding process, there are only drawn the polygons present in front and the interior of the polyhedron 520 is invisible. Points 531 and 532 indicate the positions of the specified color respectively before and after the color space compression.

Thus the user is rendered capable of selecting the matching option optimum for the document to be outputted, while confirming the mapped states of the plural specified colors, thereby eventually selecting the matching option optimum for each printing operation.

Though FIG. 23 shows the display of only one specified color, it is also possible to simultaneously display plural colors according to the designation of the user. However, in a case of simultaneous display of plural colors, some colors may become hidden by the face hiding process, depending on the positional relationship between such colors and the viewing point.

Variation 1 of Fourth Embodiment

Figure 24:
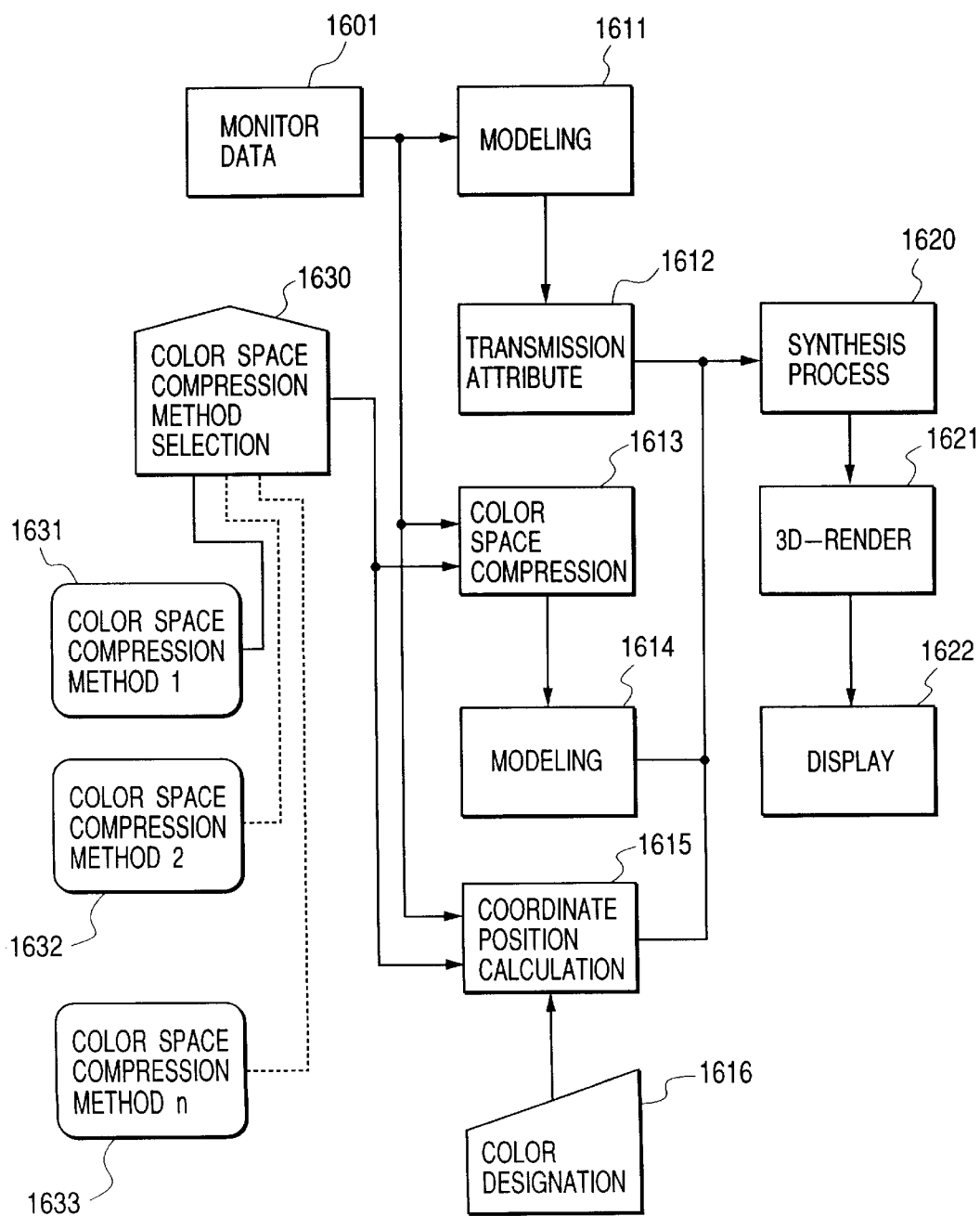
FIG. 24 is a schematic block diagram showing the process in the rendering process in a variation 1 of the embodiment 4.

In the following there will be explained a variation 1 of the fourth embodiment, with reference to FIG. 24, which is a schematic block diagram showing a process corresponding the rendering process unit 116 in FIG. 19. In the present variation, the model data representing the color reproduction range are not prepared in advance but are generated according to the selected monitor or the selected color matching option by a model data generating function provided in the processing system. In the present variation, there is utilized a modeling means for calculating the color reproduction range in the space by a convex polyhedron generating algorithm. Such algorithm will not be explained further as various methods have been proposed therefor.

The generation of the model data is conducted at first for the color reproduction range of the monitor. The monitor data 601 contain the color characteristic information of the currently selected monitor, and the modeling unit 611 utilizes such information to generate the samples of 125 points and determines the Lab values of these points. Thus surfacial polygons (triangles) enveloping these spatial point group are automatically generated by the convex polyhedron generating algorithm. The generated model data are respectively given transparency attributes, as exemplified in the following. In the following example, polygon faces present between the TransparentBegin( ) sentence and the TransparentEnd sentence had the transmissive attribute and the transmittance thereof is defined by a parameter in the TransparentBeign( ) sentence. As the polygons themselves defining the outer contour become invisible if a transparency of 100% is selected, a transparency of 80% (corresponding to a designated value of 0.8) is selected in the present embodiment:

---

Filename "Model-A1"
ModelBegin // Monitor A (no compress)
    Vertex Px1, Py1, Pz1
    Vertex Px2, Py2, Pz2
    ...
    TransparentBegin(0.8)
    Vertex PxM1, PyM1, PzM1

-continued

Polygon 3 ti1 tj1 tk1
    Polygon 3 ti2 tj2 tk2
    ...
    Polygon 3 tiN1 tjN1 tkN1
    TransparentEnd
ModelEnd
ModelBegin // Monitor A (compressed)
    Vertex px1, py1, pz1
    Vertex px2, py2, pz2
    ...
    Vertex pxM2, pyM2, pzM2
    Polygon 3 ti1 tj1 tk1
    Polygon 3 ti2 tj2 tk2
    ...
    Polygon 3 tiN2 tjN2 tkN2
ModelEnd

---

Then the model data are generated for the color reproduction range after the color space compression. Monitor data 1611 and a color matching option handle 1630 indicating the currently selected color space compressing method are transferred to a color space compression calculating unit 1613, which generates the samples of 125 points after the color space compression and calculates the Lab values of each point. A modeling unit 1614 automatically generates surfacial polygons enveloping the sequence of points in the space by the convex polyhedron generating algorithm. The transparency attribute is not attached in this case.

A coordinate position calculating unit 1615 receives the monitor data 1611, the color matching option handle 1630 and the RGB values of a specified color designated by a color designating unit 1616, and determines the coordinate position of the specified color on the currently selected monitor. The coordinate position is determined in two values respectively before and after the color space compression, and these values are transferred to a synthesis process 1620.

The synthesis process 1620 synthesizes the polygon data indicating the color reproduction range of the monitor before the color space compression, those after the color space compression and the data of the two coordinate positions (before and after the color space compression) of the specified color, and transfers the synthesized data to a 3-D renderer process 1621, which generates a two-dimensional image from the designated three-dimensional object and executes display on the display unit. The user is rendered capable of switching to a matching option optimum for the document to be outputted, while observing the display.

Variation 2 of Fourth Embodiment

Figure 25:
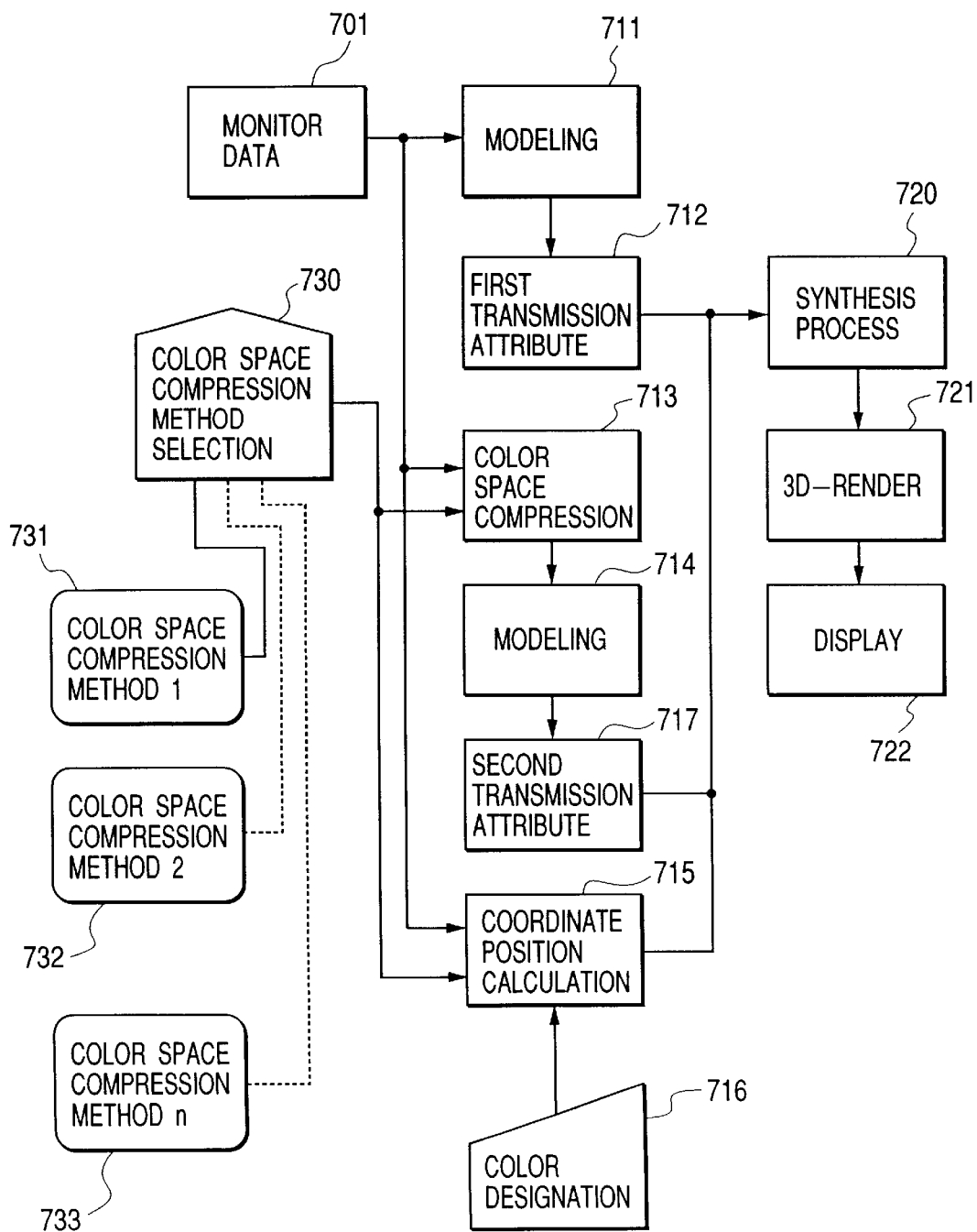
FIG. 25 is a schematic block diagram showing the process in the rendering process in a variation 2 of the embodiment 4.

In the following there will be explained a variation 2 of the fourth embodiment with reference to FIG. 25, which is a schematic block diagram showing a process corresponding to the rendering process unit 116 shown in FIG. 19.

In the present variation, the model data representing the color reproduction range are not prepared in advance but are generated according to the selected monitor or the selected color matching option by a model data generating function provided in the processing system. The present variation features a fact that the polygons representing the color reproduction range after the color space compression are given a second transparency attribute.

The generation of the model data is conducted at first for the color reproduction range of the selected monitor. The monitor data 701 contain the color characteristic information of the currently selected monitor, and the modeling unit 711 utilizes such information to generate the samples of 125 points and determines the Lab values of these points. Thus surfacial polygons (triangles) enveloping these spatial point group are automatically generated by the convex polyhedron generating algorithm. The generated model data are respectively given a first transparency attribute by a process 712. As the polygons themselves defining the outer contour become invisible if a transparency of 100% is selected, a transparency of 80% (corresponding to a designated value of 0.8) is selected in the present embodiment.

Then the model data are generated for the color reproduction range after the color space compression. Monitor data 711 and a color matching option handle 730 indicating the currently selected color space compressing method are transferred to a color space compression calculating unit 713, which generates the samples of 125 points after the color space compression and calculates the Lab values of each point. A modeling unit 714 automatically generates surfacial polygons enveloping the sequence of points in the space by the convex polyhedron generating algorithm. The generated model data are given a second transparency attribute in a process 717. A transmittance of 20% (corresponding to a designating value of 0.2) is selected for the second transparency attribute. Thus, combination with the aforementioned polygons constituting the outer contour, there are obtained following data:

```
Filename "Model-A1"
ModelBegin // Monitor A (no compress)
    Vertex Px1, Py1, Pz1
    Vertex Px2, Py2, Pz2
    ...
    TransparentBegin(0.8)
    Vertex PxM1, PyM1, PzM1
    Polygon 3 ti1 tj1 tk1
    Polygon 3 ti2 tj2 tk2
    ...
    Polygon 3 tiN1 tjN1 tkN1
    TransparentEnd
ModelEnd
ModelBegin // Monitor A (compressed)
    Vertex px1, py1, pz1
    Vertex px2, py2, pz2
    ...
    Vertex pxM2, pyM2, pzM2
    TransparentBegin(0.2)
    Polygon 3 ti1 tj1 tk1
    Polygon 3 ti2 tj2 tk2
    ...
    Polygon 3 tiN2 tjN2 tkN2
    TransparentEnd
ModelEnd
```

A coordinate position calculating unit 715 receives the monitor data 711, the color matching option handle 730 and the RGB values of a specified color designated by a color designating unit 716, and determines the coordinate position of the specified color on the currently selected monitor. The coordinate position is determined in two values respectively before and after the color space compression. In the present variation, an arrow line is formed from the point A (coordinate before the color space compression) to the point A' (coordinate after the color space compression) to facilitate visual comprehension, as indicated in the following:

```
Filename "Model-Point"
ModelBegin // 2points
PointSet sphere radious(0.5)
```

-continued

```
    Vertex Ax Ay Az
    Vertex Ax' Ay' Az'
    Point 1 Color A
    Point 2 Color A'
    Line 1 2 arrow
ModelEnd
```

The synthesis process 720 synthesizes the polygon data indicating the color reproduction range of the monitor before the color space compression, those after the color space compression and the data of the two coordinate positions (before and after the color space compression) of the specified color, and transfers the synthesized data to a 3-D renderer process 721, which generates a two-dimensional image from the designated three-dimensional object and executes display on the display unit.

Figure 26:
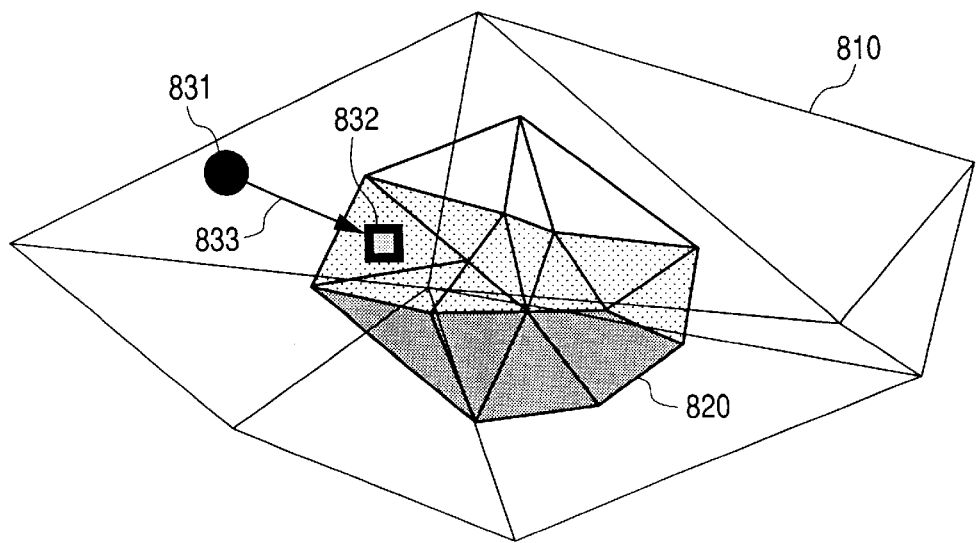
FIG. 26 is a view showing an example of three-dimensional display.

FIG. 26 shows the 3-D display in the present variation, wherein a polyhedron 810 indicates the color reproduction range of the monitor and is constituted by triangular polygons which are represented by sides and faces of a transmittance of 80%, while a polyhedron 820 indicates the color reproduction range after the color space compression and is constituted by triangular polygons which are represented by sides and faces of a transmittance of 20%. In the 3-D display of the present variation, the face hiding process is applied to the polygons which are not given the transparency attribute and which are given the transparency attribute of a transmittance of 0%, but other polygons are displayed in overlapping manner in consideration of the transparency attribute. Consequently, even if the point 832 is present inside the color reproduction range 820 as illustrated, the point 832 is rendered visible through the polygon in front because of the transparency attribute given thereto. The point 831 indicating the position of the specified color before the color space compression and the point 832 indicating the position of the specified color after the color space compression are connected by an arrow line to assist correct visual comprehension. The user is rendered capable of arbitrarily selecting the optimum matching option for the document to be outputted, while observing the above-described display.

In addition to the embodiments described in the foregoing, there can still be conceived following embodiments:

1) The monitor data 610 may be the information obtained from a profile assigned to each color device in the color management system;
2) The modeling unit 611 and the modeling unit 614 are explained as separate blocks for the convenience of description, but they may be formed as one and the same unit in the actual circuitry;
3) The color space compression is explained to compress the color reproduction range of the monitor, but such form is not restrictive and it is applicable to all the color devices in the source side and in the destination side. Also in the foregoing first to third embodiments, a reduction in volume has been explained as the color space compression, but such form is not restrictive. A color space expansion or a color space displacement can also be similarly processed;
4) The triangular polygons are employed as the basic faces in representing the color reproduction range by the surface of a polyhedron, but there may also be employed a combination of rectangular polygons and triangular polygons or a combination of pentagonal polygons and triangular polygons. Also a freely curved surface may be approximated by minute triangular polygons;

5) In employing the triangular polygons as the basic faces in representing the color reproduction range by the surface of a polyhedron, it is also possible to calculate the colors at the coordinate positions of the three vertices of the triangular polygon and to assign the corresponding color to each vertex while assigning, to a side between the vertices or a plane of the triangular polygon, a color determined by interpolation of the colors corresponding to the vertices;

6) The printer connection may be local or otherwise. Also there may be employed a process other than the printer driver installed in the system. For example there may be employed a utility software, an application software, a plug-in software to be connected to the application software, or a helper software. Naturally the process may be realized by a profile maker which prepares the color profile in the color management system;

7) The model data may be prepared in advance, or may be prepared when required, or may be cached from the data prepared at a certain time. Furthermore, such data may be stored in the profile data or in a temporary work area (memory or file);

8) The three-dimensional display may also be so constructed as to enable image displacement, rotation, reduction, etc. on a real-time basis by an input device such as a mouse, thereby enabling observation of the 3-D data from an arbitrary position; and 9) The point positioned inside the surface constituted by the polygons may be made observable, instead of designating the transparency attribute, for example by switching the face hiding process based on a certain input.

Still other embodiments are conceivable in addition to the foregoing ones, but it is to be understood that the present invention is not limited by the accompanying technologies as long as a polyhedron of which surface is constituted by triangular polygons is basically employed for representing the color reproduction range.

The fourth embodiment and the variations thereof enable to effectively visualize, with a three-dimensional display system, the mapping state of the color space compression, which has not been readily understandable in the prior art. It is also rendered possible to evaluate the change in the color reproduction range before and after the color space compression by simultaneous superposed display thereof. Also the use of the triangular polygons allows to reduce the amount of data and to achieve a higher process speed, whereby the three-dimensional data can be observed in an interactive manner with increased freedom such as with real-time data rotation or reduction. Furthermore, it is rendered possible to directly analyze the problem in the actual color printing process, by designating a specified color and observing the mapped state of such specified color. As a result, it is rendered possible to promptly set or select a color space compressing method of desired characteristics, among various color space compressing methods.

Embodiment 5

In the observation of a spatial object utilizing the 3-D rendering function, the original vertical direction of the object may become unclear if the user frequently repeats image rotation, enlargement, reduction, etc. Conventionally there have been proposed various methods such as simultaneously displaying the coordinate axes or displaying the direction in another display window, but such methods are insufficient in providing immediate understanding. Particularly in case the 3-D rendering system is used in interactive manner, there is required a high-speed display capable of immediately responding to the operation of the user and the display has to be so constructed that the user can accurately and instinctively understand the displayed image.

The present embodiment, therefore, utilizes a square parallel to the ab plane of the Lab color space and simultaneously displays such square in such a manner that the center point thereof is superposed with the original point, thereby enabling the user to immediately recognize the state of the displayed data. Such display of the square can be erased whenever unnecessary, by an operation of the user.

Figure 27:
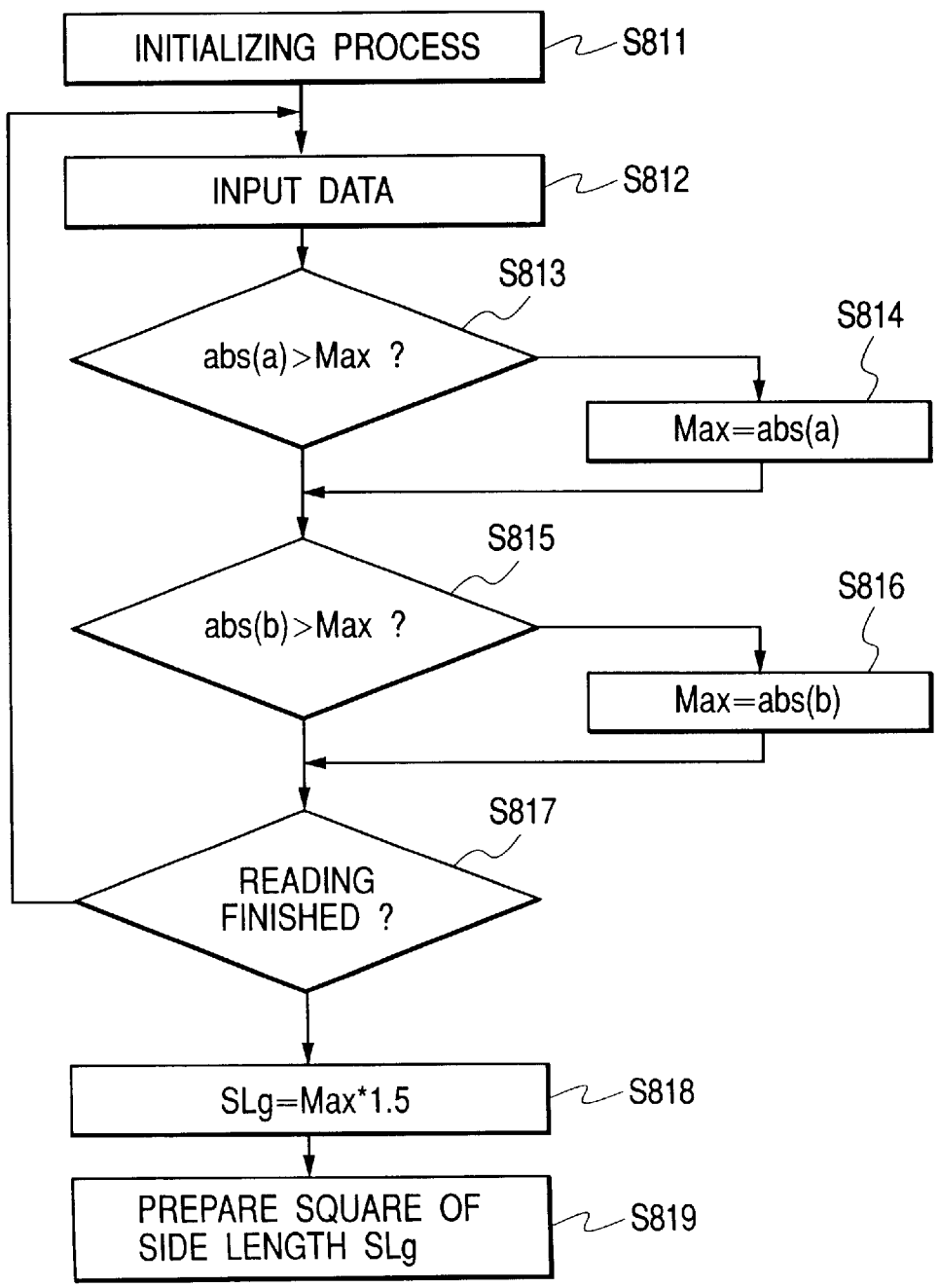
FIG. 27 is a schematic flow chart showing a process for changing the length of a square according to the distribution of the entered data.

FIG. 27 is a schematic flow chart showing a process of determining the size of the square parallel to the ab plane, by referring to the maximum and minimum Values of the a values of the input data and those of the b values. An initializing step S811 sets a variable Max to zero. A data input step S812 fetches a set of the values L, a, b representing the color reproduction range. A discrimination step S813 compares the absolute value of the a value fetched in the data input step S812 with the variable Max, and, if the former is larger, a substitution step S814 substitutes the absolute value of the a value into the variable Max. Then a discrimination step S815 compares the absolute value of the b value fetched in the data input step S812 with the variable Max, and, if the former is larger, a substitution step S816 substitutes the absolute value of the b value into the variable Max. An end discrimination step S817 discriminates whether the data fetching has been completed, and, if not, the sequence returns to the data input step S812. A side length setting step S818 sets a value obtained by multiplying the variable Max with 0.5. A coordinate setting step S819 generates the coordinate data of the square, based on the thus set value. This square is so set as to be parallel to the ab plane with the center of gravity coinciding with the original point.

Figure 28:
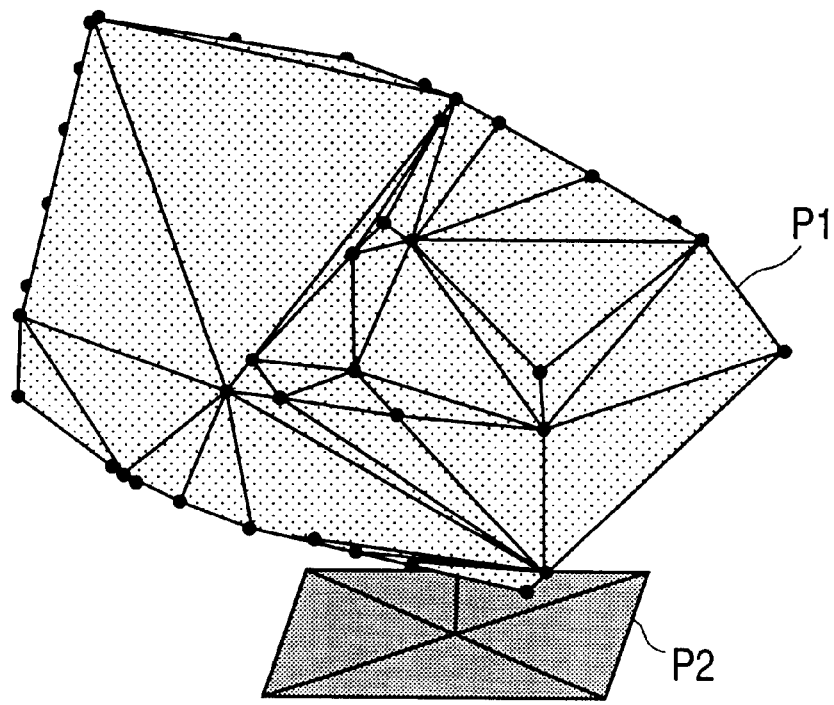
FIG. 28 is a view showing an example of representing the color reproduction area of color data, present in a Lab space, with a polyhedron, positioning a square planar object at the original point and displaying both in a 3D rendering system.

FIG. 28 shows an image synthesized from a polyhedron P1 generated from the data group representing the color reproduction range and a square P2 generated from the above-mentioned data group according to the process shown in FIG. 27, and displayed by the 3-D rendering system.

In the image shown in FIG. 28, the user can observe the surface state of the polyhedron but cannot observe the interior thereof.

Figure 29:
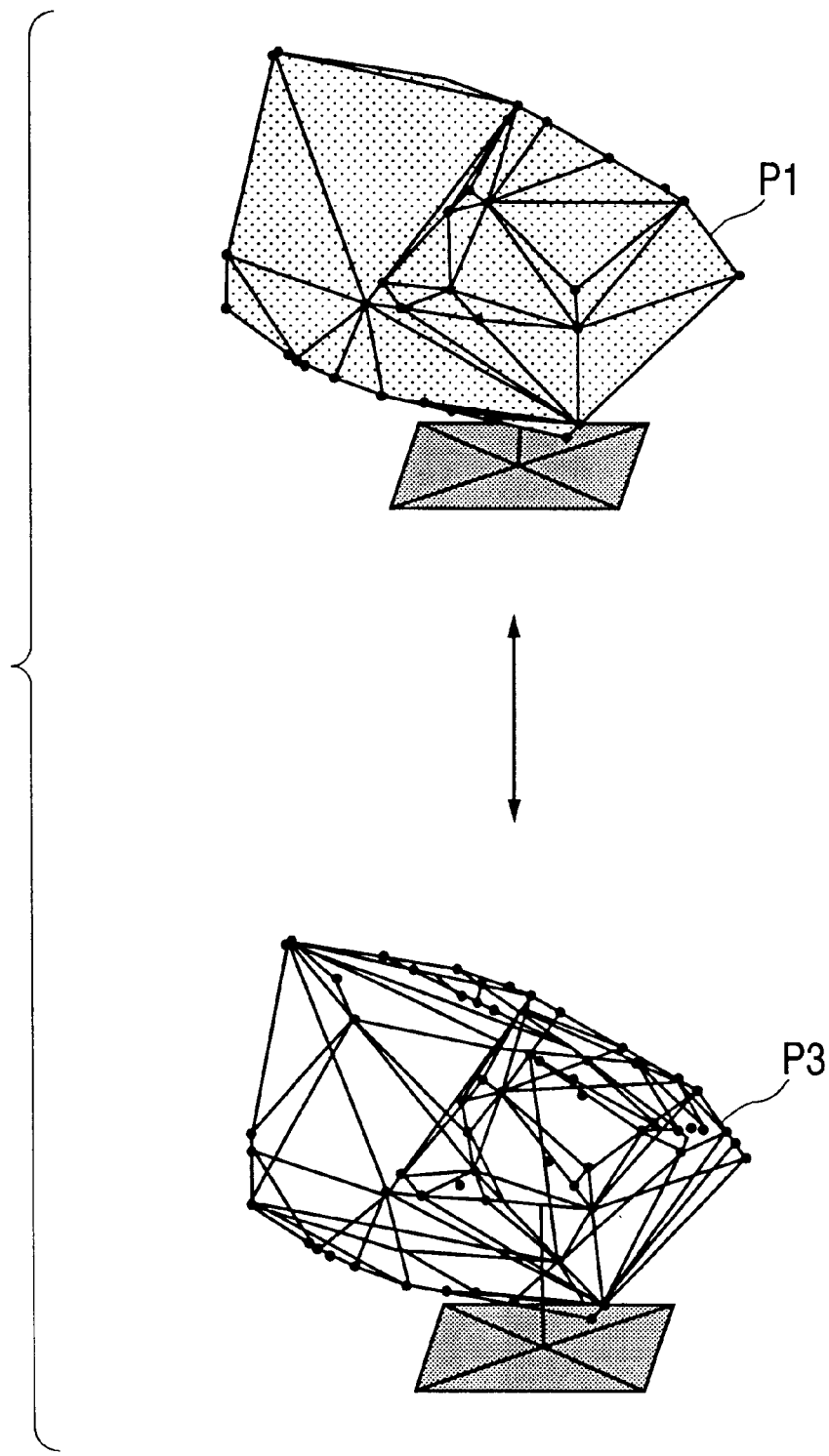
FIG. 29 is a view showing an example of representing the color reproduction area of color data, present in a Lab space, with a polyhedron and comparing the planar representation and the line representation of the triangular polygons constituting the polyhedron.

The observation of the interior can be achieved by representing the triangles, constituting the polyhedron, by the sides thereof as shown by P3 in FIG. 29, instead of the constituting planes.

The display P3 can be easily realized by the control of the transparency explained in the fourth embodiment.

The present embodiment can be realized by the control of the transparency for the color reproduction range, according to the selection of the display modes shown in FIGS. 28 (P1) and 29 (P3) by the user.

The user is rendered capable of detailed data analysis under observation of the two images suitably switched.

It is also important, in understanding the color reproduction range, to effect detailed observation thereof at a certain luminance value.

Figure 30:
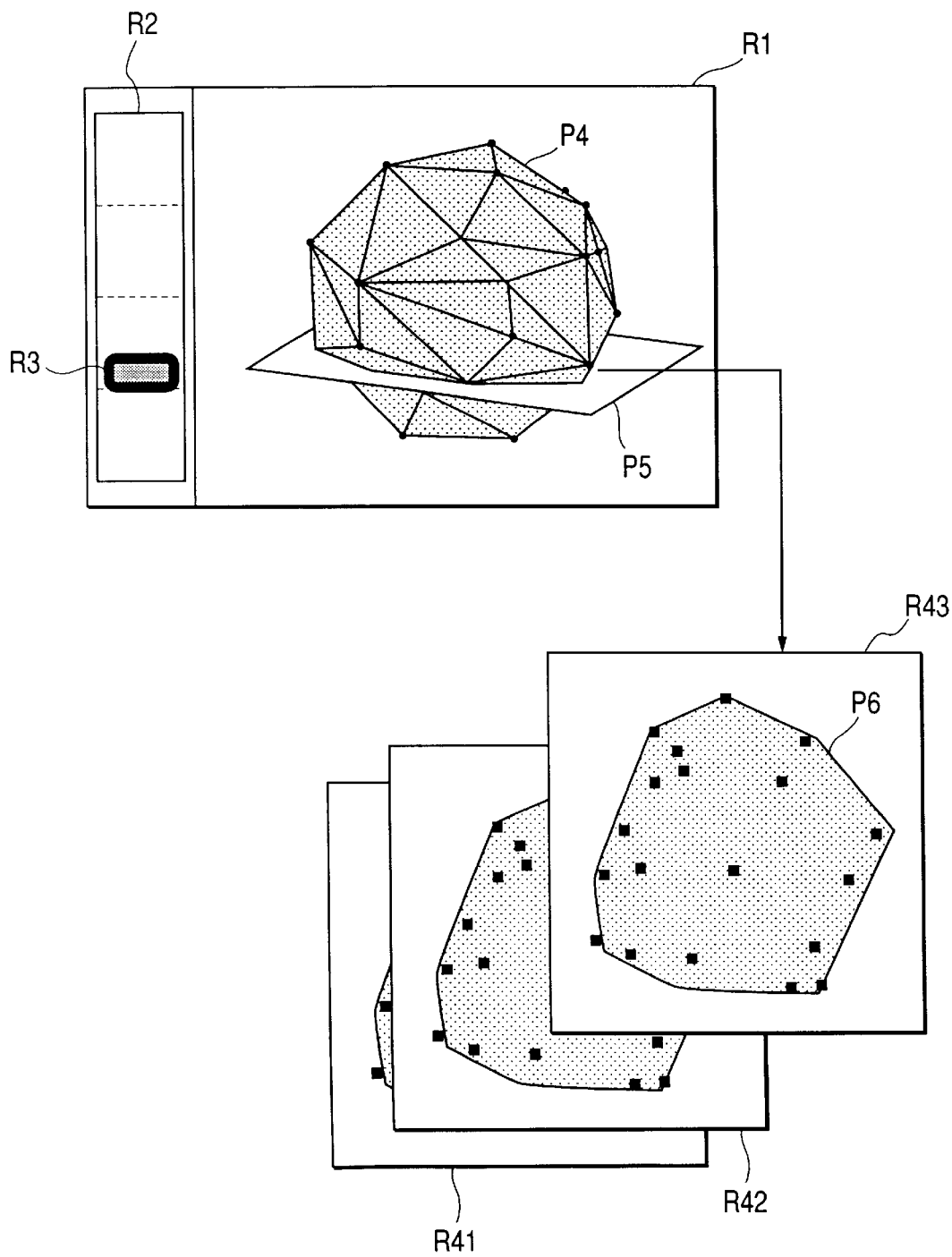
FIG. 30 is a view showing an example of display showing, in other display windows, cross sections at arbitrary positions of a polyhedron present in the space.

For this purpose, there is provided a user interface as shown in FIG. 30.

A polyhedron generating process is applied to the input point data of the Lab values to obtain a polyhedron P4, which is displayed by the 3-D rendering system in a display window R1. At the left-hand end of the display window R1, there is provided a slide bar R3 which is freely movable within a slide range R2. A square P5 parallel to the ab plane moves by the movement of the slide bar R3 to an arbitrary position. If the square overlaps with the polyhedron P4, the cross section is displayed, when required, in another display window. A display window R43 displays such cross section P6 at the position of the square R5 displayed in FIG. 30. Display windows R41, R42 display cross sections in previous positions of the square R5 and can be generated, retained or closed arbitrarily.

With respect P6 in FIG. 30, data which are not vertex included in data group (e.g., sample data of 125 points inputted in the step S301 of FIG. 21) are also represented together with the vertices of the polyhedron. Accordingly, a degree of precision of the polyhedron and color reproducibility of the device which outputted the sample data can be confirmed.

In addition to the method for displaying the color reproduction range with the 3-D rendering system explained in FIGS. 28, 29 and 30, there can be conceived following embodiments:

1) In case of handling plural images involving enlargement or reduction, these images may be replaced by squares of specified sizes in order to clarify the difference in size;
2) The top side and the bottom side of the square may be given different colors in order to clarify the vertical relationship which changes by the image rotation;
3) The triangular polygons may be given transparency attribute in order to display the internal points. In this manner it is rendered possible to observe the internal points while constantly recognizing the color reproduction range;
4) The change in color and the positional relationship thereof to the color reproduction range can be rendered observable, by defining the gradation of a specified color and representing the change in gradation by a line segment; and
5) In case the object is not displayed in a desired position by image rotation, enlargement, reduction, etc., a pre-registered icon may be selected to immediately discard the current display state and to switch the image to a registered display state.

Still other embodiments are conceivable in addition to the foregoing ones, but it is to be understood that any embodiment displaying a polyhedral model in a three-dimensional display system for the purpose of color analysis and providing easier operations for the user in the image manipulations such as rotation, enlargement, reduction, etc. is equivalent to the present invention.

In the conventional display of an object in the three-dimensional space, the vertical positional relationship of such object may become unclear if the user frequently repeats the manipulating operations such as image rotation, enlargement, reduction, etc. The present embodiment allows the user to precisely and instinctively comprehend the vertical relationship of the displayed data by simultaneously displaying a square as a base positioned in the vicinity of the original point. Also, the size of such square may be varied according to the distribution of the input data, thereby facilitating the comparison or reference of the observed data. Furthermore, a polyhedron enveloping the sequence of points is intersected by a square parallel to the ab plane and the cross section is displayed in another display window. The square is freely movable along the L axis and the cross section is varied according to the position on the L axis. In this manner the stereoscopic structure of the polyhedron can be easily understood.

The present invention may be applied to a system consisting of plural equipment or to an apparatus consisting of a single equipment. Furthermore, the present invention is naturally applicable to a case where the present invention is attained by providing a system or an apparatus with a program. In such case, the effect of the present invention can be enjoyed by such system or apparatus, by reading a storage medium which stores a program represented by a software for attaining the present invention.

The present invention is not limited to the foregoing embodiment but is subject to various modifications within the scope and spirit of the appended claims.

What is claimed is:

1. A method for generating a polyhedron to be displayed on a display unit, the method comprising steps of:

(a) generating a polygon using points in a coordinate space;
   (b) generating a polyhedron using the polygon; and
   (c) modifying a normal vector of the polygon so that a dot product of the normal vector of the polygon and a vector from an inner point of the polyhedron to the polygon becomes negative.

2. A method according to claim 1, wherein:

the normal vector of the polygon is defined by an order of vertices in the polygon; and
   said modifying step is adapted to modify the order of the vertices if the dot product is not negative.

3. A method according to claim 1, wherein the polygon is a triangular polygon.

4. A medium storing a program for carrying out a method for generating a polyhedron to be displayed on a display unit, the method comprising steps of:

(a) generating a polygon using points in a coordinate space;
   (b) generating a polyhedron using the polygon; and
   (c) modifying a normal vector of the polygon so that a dot product of the normal vector of the polygon and a vector from an inner point of the polyhedron to the polygon becomes negative.

5. A medium according to claim 4, wherein the normal vector of the polygon is defined by an order of vertices in the polygon; and
   said modifying step is adapted to modify the order of the vertices if the dot product is not negative.

6. A medium according to claim 4, wherein the polygon is a triangular polygon.

7. A method according to claim 1, wherein said method is applicable to a three-dimensional rendering system.

8. A medium according to claim 4, wherein said method is applicable to a three-dimensional rendering system.

9. An apparatus for generating a polyhedron to be displayed on a display unit, the apparatus comprising:

(a) a generating unit adapted to generate a polygon using points in a coordinate space, and to generate a polyhedron using the polygon; and
   (b) a modifying unit adapted to modify a normal vector of the polygon so that a dot product of the normal vector of the polygon and a vector from an inner point of the polyhedron to the polygon becomes negative.

10. An apparatus according to claim 9, wherein
the normal vector of the polygon is defined by an order of vertices in that polygon; and
said modifying unit is adapted to modify the order of the vertices if the dot product is not negative.

11. An apparatus according to claim 9, wherein the polygon is a triangular polygon.

12. An apparatus according to claim 9, wherein said apparatus is an apparatus with a three-dimensional rendering system.

* * * * *

UNITED STATES PATENT AND TRADEMARK OFFICE
CERTIFICATE OF CORRECTION

PATENT NO. : 6,556,198 B1
DATED : April 29, 2003
INVENTOR(S) : Naoyuki Nishikawa It is certified that error appears in the above-identified patent and that said Letters Patent is hereby corrected as shown below:

Column 1,
Line 11, "land" should read -- and --.

Column 2,
Line 27, "1a" should read -- a --; and
Line 30, "indicting" should read -- indicating --.

Column 12,
Line 37, "dolor" should read -- color --; and
Line 48, "etc." should read -- etc., --.

Column 15,
Line 53, "TransparentBeign( )" should read -- TransparentBegin( ) --.

Signed and Sealed this

Eleventh Day of November, 2003

JAMES E. ROGAN
*Director of the United States Patent and Trademark Office*